US012802653B2

(12) United States Patent
Yamashita et al.

(10) Patent No.: US 12,802,653 B2
(45) Date of Patent: Nov. 17, 2026

(54) DISPLAY, ELECTRONIC DEVICE, PIXEL UNIT AND PIXEL UNIT ARRAY

(71) Applicant: Huawei Technologies Co., Ltd., Shenzhen (CN)

(72) Inventors: Keitaro Yamashita, Osaka (JP); Qiangcan Huang, Dongguan (CN); Yasuyuki Teranishi, Tokyo (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/257,255

(22) Filed: Jul. 1, 2025

(65) Prior Publication Data

US 2025/0336369 A1 Oct. 30, 2025

Related U.S. Application Data

(63) Continuation of application No. PCT/CN2023/076913, filed on Feb. 17, 2023.

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2300/0814* (2013.01); *G09G 2300/0866* (2013.01); *G09G 2310/08* (2013.01); *G09G 2330/021* (2013.01)

(58) Field of Classification Search
CPC .... G09G 2310/08; G09G 3/3233; G09G 3/20; G09G 2300/0842
See application file for complete search history.

(56) References Cited

U.S. PATENT DOCUMENTS

| | | | | |
|---|---|---|---|---|
| 12,198,583 B1 * | 1/2025 | Tseng | G09G 3/006 | |
| 2004/0041802 A1 | 3/2004 | Tsutsui et al. | | |
| 2005/0062692 A1 | 3/2005 | Lo et al. | | |
| 2005/0088395 A1 * | 4/2005 | Chung | G09G 3/3655 | 345/98 |
| 2008/0042958 A1 * | 2/2008 | Chung | G09G 3/3655 | 345/94 |

(Continued)

FOREIGN PATENT DOCUMENTS

| | | |
|---|---|---|
| CN | 112309324 A | 2/2021 |
| CN | 112652269 A | 4/2021 |

(Continued)

*Primary Examiner* — Van N Chow
(74) *Attorney, Agent, or Firm* — Slater Matsil, LLP

(57) ABSTRACT

Embodiments of the present application provide a display, an electronic device, a pixel unit and a pixel unit array. The display includes a plurality of pixel units arranged in gate and data directions forming an array structure, where each of the plurality of the pixel units includes: a first input terminal, a second input terminal, and a third terminal; the first input terminal, configured to receive an enable signal from an enable line in the data direction, the second input terminal, configured to receive a gate control signal from a gate line in the gate direction, the third input terminal, configured to receive a display data signal from a data line in the data direction, and each of the plurality of the pixel units, configured to display information according to the display data signal under a control of the gate control signal and the enable signal.

20 Claims, 16 Drawing Sheets

(56) References Cited

U.S. PATENT DOCUMENTS

| | | | | |
|---|---|---|---|---|
| 2008/0068307 | A1 | 3/2008 | Kawabe | |
| 2009/0066617 | A1* | 3/2009 | Chang | G09G 3/3233 345/82 |
| 2009/0174646 | A1* | 7/2009 | Lim | G09G 3/3677 345/100 |
| 2013/0187897 | A1 | 7/2013 | Liu | |
| 2013/0215090 | A1* | 8/2013 | Kim | G09G 3/36 345/204 |
| 2013/0257752 | A1 | 10/2013 | Tripathi et al. | |
| 2013/0293600 | A1 | 11/2013 | Lee et al. | |
| 2014/0092076 | A1 | 4/2014 | Lee | |
| 2014/0247294 | A1 | 9/2014 | Kim | |
| 2015/0287378 | A1* | 10/2015 | Jeong | G09G 3/3688 345/694 |
| 2016/0093237 | A1* | 3/2016 | Lee | G09G 3/3688 345/213 |
| 2020/0175912 | A1* | 6/2020 | Lee | G09G 3/3233 |
| 2021/0027707 | A1* | 1/2021 | Park | G09G 3/035 |
| 2021/0035499 | A1 | 2/2021 | Qian et al. | |
| 2022/0383806 | A1* | 12/2022 | Ha | G09G 3/3208 |
| 2022/0415264 | A1* | 12/2022 | Lee | G09G 3/3233 |
| 2023/0260450 | A1* | 8/2023 | Zhang | G09G 3/32 345/55 |

FOREIGN PATENT DOCUMENTS

| | | | |
|---|---|---|---|
| CN | 115311982 | A | 11/2022 |
| CN | 115359750 | A | 11/2022 |
| KR | 20220105886 | A | 7/2022 |

* cited by examiner

DISPLAY, ELECTRONIC DEVICE, PIXEL UNIT AND PIXEL UNIT ARRAY

CROSS-REFERENCE TO RELATED APPLICATIONS

This application is a continuation of International application No. PCT/CN2023/076913, filed on Feb. 17, 2023, the disclosure of which is hereby incorporated by reference in its entirety.

TECHNICAL FIELD

Embodiments of the present application relate to the field of displaying technologies, and more specifically, to a display, an electronic device, a pixel unit and a pixel unit array.

BACKGROUND

Power consumption is a key measure of electronic devices. Reducing power consumption of displays of electronic devices may efficiently save power consumption of electronic devices.

For a display, one approach to reducing display power consumption is to reduce the frame rate, since the display power consumption is proportional to its frame rate. However, the actual displaying content is not limited to videos or pictures in the entire active area, but more practically in areas where videos and still images are mixed with some area ratio for each. Currently, even if a tiny portion of the active area is video, the frame rate of the entire display area is dragged by the frame rate of that video, even though the still image in the rest of the active area can be down to 1 Hz refresh rate. In such a case, the power consumption of the display is not saved.

SUMMARY

Embodiments of the present application provide a display, an electronic device, a pixel unit and a pixel unit array. The technical solution could save the power consumption of the display.

According to a first aspect of the present application, an embodiment of the present application provides a display, where the display includes: a plurality of pixel units arranged in gate and data directions forming an array structure, where each of the plurality of the pixel units includes: a first input terminal, a second input terminal, and a third terminal; the first input terminal, configured to receive an enable signal from an enable line in the data direction, the second input terminal, configured to receive a gate control signal from a gate line in the gate direction, the third input terminal, configured to receive a display data signal from a data line in the data direction, and each of the plurality of the pixel units, configured to display information according to the display data signal under a control of the gate control signal and the enable signal.

In accordance with the above-mentioned technical solution, the pixel unit may be controlled by both the gate control signal in the gate direction and the enable signal in the data direction. Therefore, the display may be divided into several blocks by the gate control signal in the gate direction and the enable signal in the data direction. Different refresh rates of may be applied within different blocks, which can achieve the purpose of reducing power consumption.

In a possible design, where each of the plurality of the pixel units, further includes: a first switch, a second switch, a capacitor, and a light-emitting element, where the enable signal is configured to control a state of the first switch to be on or off; the gate control signal is configured to control a state of the second switch to be on or off; the capacitor, configured to store the display data signal according to the enable signal applied to the first switch and the gate control signal applied to the second switch; and the light-emitting element, configured to be controlled according to the display data signal stored by the capacitor.

In accordance with the above-mentioned technical solution, the first switch may electrically connect or isolate the capacitor. When the first switch goes to off, the voltage on the capacitor is preserved no matter what signals come to the pixel unit. By this way, some pixel units on a row with the first switch being off are selectively preserved, thereby making block driving.

In a possible design, where the display further includes an enable signal acquisition circuit and a data driver circuit, where the data driver circuit includes a first output terminal, and where the first output terminal is configured to output a first output signal; the enable signal acquisition circuit is configured to obtain the enable signal according to the first output signal and output the enable signal to at least one pixel unit of the plurality of pixel units.

The data driver circuit need to generate the enable singles to control the pixel units, which may increase the number of terminals (pins) of the data driver circuit. Base on the above-mentioned technical solution, the enable signal acquisition circuit may be used to obtain the enable signal in accordance with the output of the first output terminal. Therefore, the issue of increased terminals (pins) may be solved.

In a possible design, where the first output signal includes serial enable data signals; the enable signal acquisition circuit is further configured to obtain the serial enable data signals, convert the serial enable data signals to M parallel enable data signals, and output M enable signals to M enable lines according to the M parallel enable data signals, where each of the M enable lines corresponds to at least one pixel unit column, where M is a positive integer greater than 1.

Optionally, the enable lines are extended to the data direction.

Base on the above-mentioned technical solution, the enable signal acquisition circuit may obtain the enable signal in accordance with the serial enable data signal from the first output terminal of the data driver circuit. Therefore, the data driver circuit may use a few terminal to output the enable signals.

In a possible design, where the enable signal acquisition circuit includes M enable signal acquisition units, where the M enable signal acquisition units are in one-to-one correspondence to the M enable lines, each of the M enable signal acquisition units includes a first sub-unit and a second sub-unit, where the first sub-unit is configured to obtain the serial enable data signals and convert the serial data enable signals to an enable data signal of a corresponding enable line, the second sub-unit is configured to obtain and store the enable data signal of the corresponding enable line, the second sub-unit is further configured to transmit an enable signal to at least one pixel unit through the corresponding enable line in according to the stored enable data signal and a first control signal obtained from the data driver circuit.

In a possible design, where the first output signal further includes a display data signal; the data driver circuit further includes a second output terminal, where the second output terminal is configured to output a second control signal; and the enable signal acquisition circuit is further configured to obtain the enable signal from the first output signal according to the second control signal.

Base on the above-mentioned technical solution, the first output terminal of the data driver circuit may be configured to output both the display data signal and the enable signal. Therefore, the issue of increased terminals (pins) may be solved due to the multiplexed terminal.

In a possible design, where the enable signal acquisition circuit includes M enable signal acquisition units, where the M enable signal acquisition units are in one-to-one correspondence to M columns of pixel unit; each of the M enable signal acquisition units is configured to obtain and store the enable signal of a corresponding pixel unit column according to the second control signal; and each of the M enable signal acquisition units is further configured to output the enable signal of the corresponding pixel unit column to at least one pixel unit of the corresponding pixel unit column with the display data signal of the corresponding pixel unit column.

In a possible design, where the data driver circuit includes a switch unit, where the switch unit is configured to control that signal output by the first output terminal is the display data signal or the enable signal.

In a possible design, where the enable signal includes a high voltage signal and a low voltage signal, the switch unit includes three switches, where the three switches are configured to control that a signal output by the first output terminal is one of the high voltage signal, the low voltage signal, or the display data signal.

In a possible design, where the display further includes a first gate driver on array, GOA, circuit, and a second GOA circuit, where the first GOA circuit is arranged on a first side of the display, the second GOA circuit is arranged on a second side of the display, where the first side is an opposite side of the second side; the data driver circuit is arranged on a third side of the display; and the enable signal acquisition circuit is arranged on a fourth side of the display or on the third side of the display.

In a possible design, where the display further includes a data driver circuit, where the data driver circuit includes K terminals, where each of the K terminals corresponds to one or more pixel units, and where the each of the K terminals is configured to transmit the enable signal to pixel units of the plurality of columns of pixel unit.

Based on the above-mentioned technical solutions, the data driver circuit may only use K terminals to output the enable signals.

According to a second aspect, an embodiment of the present application provides an electronic device including the display according to any one of possible designs of the first aspect.

According to a third aspect, an embodiment of the present application provides a pixel unit including a first input terminal, a second input terminal, and a third terminal; the first input terminal, configured to receive an enable signal from an enable line in the data direction, the second input terminal, configured to receive a gate control signal from a gate line in the gate direction, the third input terminal, configured to receive a display data signal from a data line in the data direction, and each of the plurality of the pixel units, configured to display information according to the display data signal under a control of the gate control signal and the enable signal.

In a possible design, where the pixel unit further includes: a first switch, a second switch, a capacitor, and a light-emitting element, where the enable signal is configured to control a state of the first switch to be on or off; the gate control signal is configured to control a state of the second switch to be on or off; the capacitor, configured to store the display data signal according to the enable signal applied to the first switch and the gate control signal applied to the second switch; and the light-emitting element, configured to be controlled according to the display data signal stored by the capacitor.

According to a fourth aspect, an embodiment of the present application provides a pixel unit array, where the pixel unit array including a plurality of pixel units arranged in gate and data directions forming an array structure, where each of the plurality of the pixel units includes: a first input terminal, a second input terminal, and a third terminal; the first input terminal, configured to receive an enable signal from an enable line in the data direction, the second input terminal, configured to receive a gate control signal from a gate line in the gate direction, the third input terminal, configured to receive a display data signal from a data line in the data direction, and each of the plurality of the pixel units, configured to display information according to the display data signal under a control of the gate control signal and the enable signal.

In a possible design, each of the plurality of the pixel units, further includes: a first switch, a second switch, a capacitor, and a light-emitting element, where the enable signal is configured to control a state of the first switch to be on or off; the gate control signal is configured to control a state of the second switch to be on or off; the capacitor, configured to store the display data signal according to the enable signal applied to the first switch and the gate control signal applied to the second switch; and the light-emitting element, configured to be controlled according to the display data signal stored by the capacitor.

According to a fifth aspect, an embodiment of the present application provides a data driver circuit, wherein the data driver circuit comprises: at least one first terminal, configured to output display data signals; M second terminal(s), configured to output enable signals, wherein each of the enable signals is used to control a state of at least one pixel unit to be on or off, wherein M is a positive integer greater than or equal to one.

The data driver circuit need to generate the enable singles to control the pixel units, which may increase the number of terminals (pins) of the data driver circuit. Base on the above-mentioned technical solution, the enable signal acquisition circuit may be used to obtain the enable signal in accordance with the output of the first output terminal. Therefore, the issue of increased terminals (pins) may be solved.

In a possible design, where when M is equal to one, the M second terminal is specifically configured to output a serial enable signal comprising the enable signals.

In a possible design, where when M is greater than one, the data driver circuit further comprises M switch units, wherein the M switch units are in one-to-one correspondence with the M second terminals; each of the M switch units is configured to control that signal output by a corresponding second terminal is the display data signal or the enable signal.

In a possible design, where the enable signal comprises a high voltage signal and a low voltage signal, each of the M switch units comprises three switches, wherein the three switches are configured to control that a signal output by the corresponding second terminal is one of the high voltage signal, the low voltage signal, or the display data signal.

According to a sixth aspect, an embodiment of the present application provides a method for displaying, where the method comprises: determining K first area(s), wherein the first area is used to display dynamic data, wherein K is a positive integer greater than or equal to one; determining K first box(es) according to the K first area(s), wherein each of the K first box(es) is in one-to-one correspondence with the K first area(s); determining at least one second box according to the K first box(es); outputting a first gate control signal and a first enable signal for enabling a plurality of pixel units belonging to the K first box(es); outputting a second gate control signal and/or a second enable signal for disabling a plurality of pixel units belonging to the at least one second box.

In accordance with the above-mentioned technical solution, the display may be divided into several boxes. Different refresh rates of may be applied within different blocks, which can achieve the purpose of reducing power consumption.

In a possible design, where when K is equal to one, the K first box(es) is a minimum rectangular enclosing the K first area(s).

In a possible design, where when K is greater than one and the K first area(s) overlap each other in a gate direction, an side length of each of the K first box(es) in the gate direction is equal to a logical or result of side lengths of the K first box(es) in the gate direction.

In a possible design, where when K is greater than one and the K first area(s) overlap each other in a data direction, an side length of each of the K first box(es) in the data direction is equal to a logical or result of side lengths of the K first box(es) in the data direction.

DETAILED DESCRIPTION OF ILLUSTRATIVE EMBODIMENTS

The following describes the technical solutions in the present application with reference to the accompanying drawings.

A display in the present application includes but is not limited to a liquid crystal display (LCD), a light-emitting diode (LED) display, an organic light-emitting diode (OLED) display, an active-matrix organic light-emitting diode (AMOLED) display, a nanorod LED (nano-LED or nanoLED) display or the like.

The display may be a flat panel display, a flexible display, or a micro-electromechanical system (MEMS)-based display, and the present application is not limited thereto.

A pixel unit mentioned in the present application may be a pixel or a sub-pixel.

For convenience, the AMOLED display and the sub-pixel are used for detailed descriptions in the following.

Figure 1:
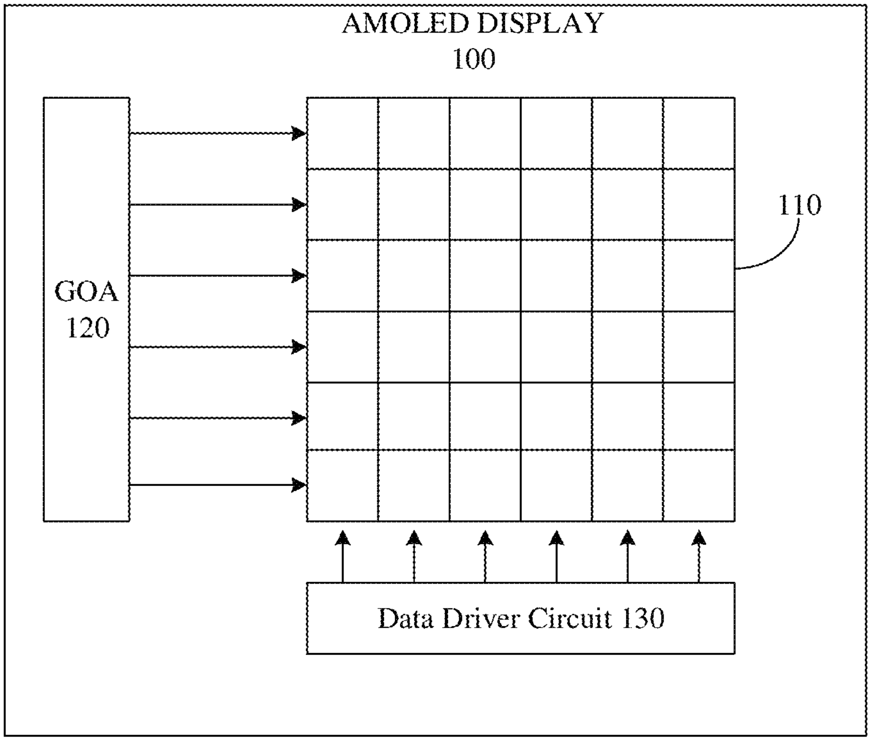
FIG. 1 shows a structure of an AMOLED display in accordance with some embodiments of the present application.

FIG. 1 shows a structure of an AMOLED display in accordance with some embodiments of the present application. As shown in FIG. 1, an AMOLED display 100 includes a pixel array 110, a gate driver on array (GOA) circuit 120, and a data driver circuit 130.

The pixel array 110 includes a plurality of sub-pixels arranged in gate and data directions. In some embodiments, the gate direction can also be referred to as a horizontal direction, a row direction or a row, and the data direction can also be referred to as a vertical direction, a column direction or a column. For ease of description, in the following embodiments, it is assumed that the pixel array 110 includes X rows and Y columns sub-pixels.

Figure 2:
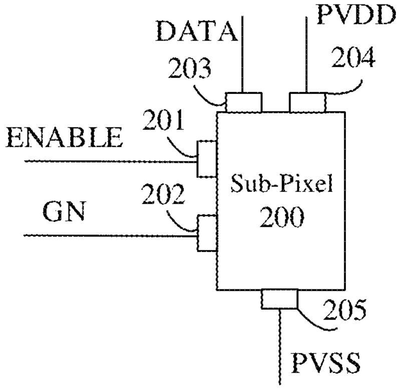
FIG. 2 shows a sub-pixel in accordance with some embodiments of the present application.

FIG. 2 shows a sub-pixel in accordance with some embodiments of the present application. A sub-pixel 200 shown in FIG. 2 is any one of the sub-pixels in the pixel array 110 shown in FIG. 1.

As shown in FIG. 2, the sub-pixel 200 includes five terminals, a terminal 201, a terminal 202, a terminal 203, a terminal 204, and a terminal 205.

The terminal 201 is configured to obtain an enable signal. ENABLE in FIG. 2 is the enable signal. For convenience, the terminal 201 can also be referred to as an enable terminal.

The terminal 202 is configured to obtain a gate control signal. GN in FIG. 2 is the gate control signal. For convenience, the terminal 202 can also be referred to as a GN terminal.

The terminal 203 is configured to obtain a display data signal. DATA in FIG. 2 is the display data signal. For convenience, the terminal 203 can also be referred to as a data terminal.

The terminal 204 and the terminal 205 are configured to obtain power signal. More specifically, the terminal 204 is configured to obtain a positive power signal, and the terminal 205 is configured to obtain a negative power signal.

PVDD in FIG. 2 is the positive power signal, and PVSS in FIG. 2 is the negative power signal. Therefore, the terminal 204 may be referred to as a PVDD terminal, and the terminal 205 may be referred to as a PVSS terminal.

Figure 3:
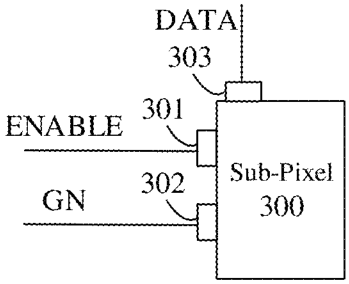
FIG. 3 illustrates a sub-pixel in accordance with some other embodiments of the present application.

FIG. 3 illustrates a sub-pixel in accordance with some other embodiments of the present application. The sub-pixel 300 shown in FIG. 3 is any one of sub-pixels in a pixel array of an LCD.

Referring to FIG. 3, the sub-pixel 300 include a terminal 301, a terminal 302, and a terminal 303. The terminal 301 is configured to obtain the enable signal. In other words, the terminal 301 is the enable terminal. The terminal 302 is configured to obtain the gate control signal. In other words, the terminal 302 is the GN terminal. The terminal 303 is configured to obtain the data terminal. So, the terminal 303 is the data terminal.

In the prior art, a sub-pixel may include multiple transistors, one or more storage capacitors, and one organic light-emitting diode (OLED). For convenience, a structure of the sub-pixel in the prior art may be referred to as $\alpha T\beta C$, where $\alpha$ is the number of the transistor in the sub-pixel and $\beta$ is the number of the storage capacitor in the sub-pixel, $\alpha$ and $\beta$ are a positive integer. For example, a 7T1C sub-pixel includes 7 transistors, 1 storage capacitor, and 1 OLED; a 5T2C sub-pixel includes 5 transistors, 2 storage capacitors, and 1 OLED.

An embodiment of the present application provides a display, where the display includes: a plurality of sub-pixels arranged in gate and data directions forming an array structure, where each of the plurality of the sub-pixels includes: a first input terminal, a second input terminal, and a third terminal; the first input terminal, configured to receive an enable signal from an enable line in the data direction, the second input terminal, configured to receive a gate control signal from a gate line in the gate direction, the third input terminal, configured to receive a display data signal from a data line in the data direction, and each of the plurality of the pixel units, configured to display information according to the display data signal under a control of the gate control signal and the enable signal.

In accordance with the above-mentioned technical solution, the pixel unit (that is, the sub-pixel) may be controlled by both the gate control signal in the gate direction and the enable signal in the data direction. Therefore, the display may be divided into several blocks by the gate control signal in the gate direction and the enable signal in the data direction. Different refresh rates of may be applied within different blocks, which can achieve the purpose of reducing power consumption.

The sub-pixel provided by the embodiment of the present application may include a first input terminal, a second input terminal, a first switch, a second switch, a capacitor, and a light-emitting element, where the first input terminal is configured to receive the enable signal, wherein the enable signal is configured to control whether a state of the first switch is on or off; the second input terminal is configured to receive the gate control signal, wherein the gate control signal is configured to control whether a state of the second switch is on or off, the capacitor is configured to store a data (e.g., the display data signal) according to the enable signal applied to the first switch and the gate control signal applied to the second switch; and the light-emitting element is configured to be controlled in according to the data stored by the capacitor. The light-emitting element mentioned in embodiments of the present application may be a light-emitting diode (LED), a nanorod LED (or nanorod, or nano-LED), a quantum dot (QD) LED, or the like.

In some embodiments, the first switch and the second switch may be transistors. When the first switch and the second switch are transistors, a structure of the sub-pixel according to the present application may be referred to as $(\alpha+1)T\beta C$. In other words, compared with the sub-pixel in the prior art, the sub-pixel according to the present application further includes at least one additional transistor. For convenience, the additional transistor may be referred to as additional components. In contrast to the additional component, other components in the sub-pixel may be referred to as regular components. The sub-pixel including $(\alpha+1)T\beta C$ includes $(\alpha+\beta)$ regular components and one additional component for example.

Figure 4:
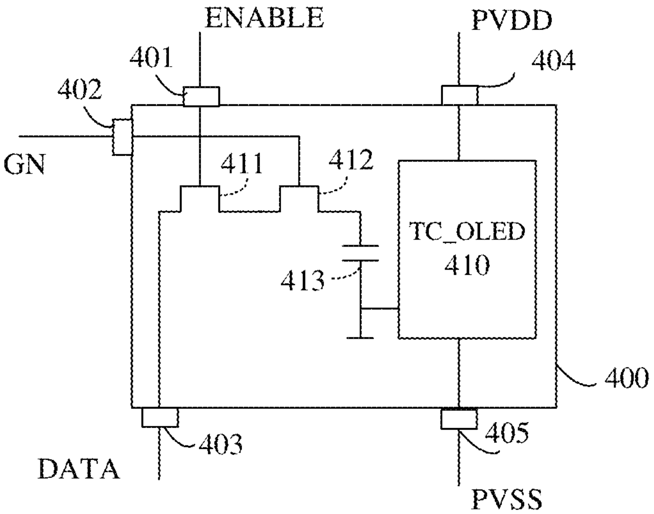
FIG. 4 illustrates a sub-pixel in accordance with some embodiments of the present application.

FIG. 4 illustrates a sub-pixel in accordance with some embodiments of the present application.

Referring to FIG. 4, the sub-pixel 400 includes five terminals. A terminal 401 is the enable terminal, the terminal 402 is the GN terminal, the terminal 403 is the data terminal, the terminal 404 is the PVDD terminal, and the terminal 405 is the PVSS terminal. Further, the sub-pixel 400 includes a transistor 411, a transistor 412, a capacitor 413, and a TC_OLED circuit 410. The transistor 411 is the additional transistor. The TC_OLED circuit 410 includes $\alpha-1$ transistor(s), $\beta-1$ capacitor(s) and one OLED. In other words, the TC_OLED circuit 410 includes components of the sub-pixel in the prior art other than the transistor 412 and the capacitor 413. Connections of the components in the TC_OLED may refer to the sub-pixel in the prior art.

Referring to FIG. 4, the transistor 411 is coupled to the terminal 401 and the terminal 403, the transistor 412 is coupled to the terminal 402, and the capacitor 413 is coupled to the transistor 412. Therefore, the capacitor 413 is configured to store a data according to the enable signal applied to the terminal 411 and the gate control signal applied to the terminal 412.

It should be noted that FIG. 4 only schematically illustrates a sub-pixel of the present application. For example, referring to FIG. 4, the transistor 411 is directly coupled to the terminal 401 and the terminal 403. In some other embodiments, the transistor 411 may be coupled to the terminal 401 and/or the terminal 403 via at least one other components. For example, the transistor 411 may be coupled to the terminal 401 via one or more transistors, capacitors or diodes. Similarly, in some other embodiments, the transistor 412 may be coupled to the terminal 402 and/or the transistor 411 via one or more components, and the capacitor 413 may be coupled to the transistor 412 via one or more components.

In some embodiments, the capacitor (e.g. the capacitor 413) may be referred to as a storage capacitor; the transistor configured to obtain the enable signal (e.g., the transistor 411) may be referred to as an enable transistor or an enable switch; the transistor configured to obtain the gate control signal (e.g., the transistor 412) may be referred to as a gate transistor or a gate switch. Other transistors (e.g., the transistors belonging to the TC_OLED circuit 410) may be referred to as drive transistors.

The enable transistor may electrically connect or isolate the storage capacitor. When the enable transistor goes to off, the voltage on the storage capacitor is preserved no matter what signals come to the sub-pixel. In this way, some sub-pixels on a row with the enable transistor being off are selectively preserved, thereby making block driving.

Figure 5:
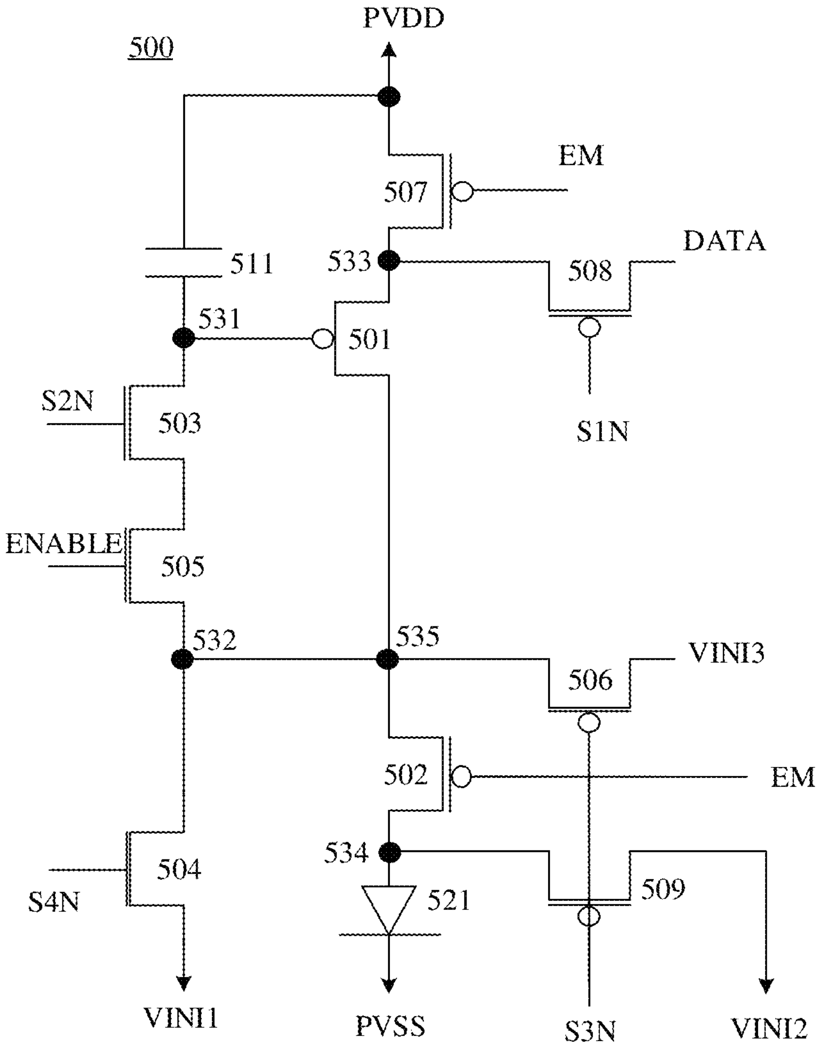
FIG. 5 illustrates a sub-pixel in accordance with some embodiments of the present application.

FIG. 5 illustrates a sub-pixel in accordance with some embodiments of the present application. The sub-pixel 500 shown in FIG. 5 includes 9 transistors, 1 capacitor, and 1 OLED.

Referring to FIG. 5, the 9 transistors include a transistor 501, a transistor 502, a transistor 503, a transistor 504, a transistor 505, a transistor 506, a transistor 507, a transistor 508, and a transistor 509; the 1 capacitor includes a capacitor 511; the 1 OLED includes an OLED 521. The transistors 501 to 502 and the transistors 506 to 509 are p-type transistors, and the transistors 503 to 505 are n-type transistors. In some embodiment, the transistors shown in FIG. 5 may be a field effect transistor (FET).

A drain of the transistor 501 is coupled to a node 533, a source of the transistor 501 is coupled to a node 533, and a gate of the transistor 501 is coupled to a node 531.

A source of the transistor 502 is coupled to a node 534, a drain of the transistor 502 is coupled to the node 533, and a gate of the transistor 502 is coupled to an input terminal EM, where the input terminal EM is configured to obtain an enable control signal arranged in the horizontal direction.

A source of the transistor 503 is coupled to the node 531, a drain of the transistor 503 is coupled to a source of the transistor 505, and a gate of the transistor 503 is coupled to an input terminal S2N, where the input terminal S2N is configured to obtain a second control signal arranged in the horizontal direction.

A source of the transistor 504 is coupled to a node 532, a drain of the transistor 504 is coupled to an input terminal VINI1, where the input terminal VINI1 is configured to obtain a first initial voltage. A gate of the transistor 504 is coupled to an input terminal S4N, where the input terminal S4N is configured to obtain a fourth control signal arranged in the horizontal direction.

A source of the transistor 505 is coupled to the drain of the transistor 503, a drain of the transistor 505 is coupled to the node 532, and a gate of the transistor 505 is configured to obtain the enable signal.

A source of the transistor 506 is coupled to the node 535, a drain of the transistor 506 is coupled to an input terminal VINI3, where the input terminal VINI3 is configured to obtain a third initial voltage. A gate of the transistor 506 is coupled to an input terminal S3N, where the input terminal S3N is configured to obtain a third control signal arranged in the horizontal direction.

A source of the transistor 507 is coupled to a node 536, a drain of the transistor 507 is coupled to the node 533, and a gate of the transistor 507 is coupled to the input terminal EM.

A source of the transistor 508 is coupled to the node 533, a drain of the transistor 508 is configured to obtain the data signal, and the gate of the transistor 508 is coupled to an input terminal S1N, where the input terminal S1N is configured to obtain a first control signal arranged in the horizontal direction.

A source of the transistor 509 is coupled to the node 534. A drain of the transistor 509 is coupled to an input terminal VINI2, where the input terminal VINI2 is configured to obtain a second initial voltage. A gate of the transistor 509 is coupled to the input terminal S3N.

Compared with FIG. 4, the capacitor 511 is the capacitor 413 in FIG. 4, the transistor 505 is the transistor 411 in FIG. 4, and the transistor 508 corresponds to the transistor 412 in FIG. 5. It is understood that the sub-pixel 400 shown in FIG. 4 merely illustrates the components in accordance with the embodiments of the present application (that is, the capacitor 413, the transistor 411, and the transistor 412) constituting a charging path from the data terminal to the storage capacitor for simplicity. The sub-pixel 500 shown in FIG. 5 is an actual circuit including all components to drive the OLED. In other words, the sub-pixel 500 illustrates both the additional components and the regular components.

Figure 6:
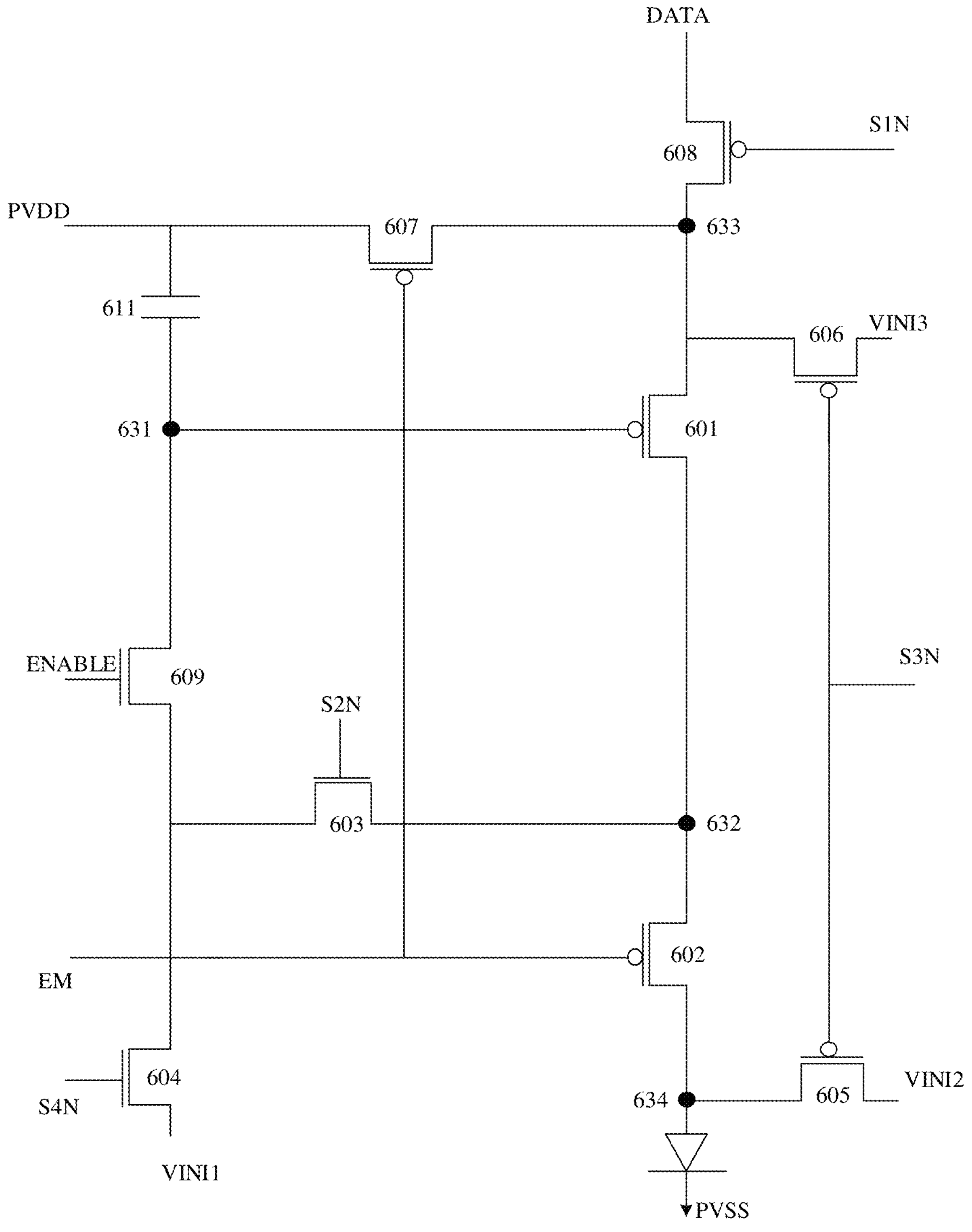
FIG. 6 illustrates a sub-pixel in accordance with some other embodiments of the present application.

FIG. 6 illustrates a sub-pixel in accordance with some other embodiments of the present application. The sub-pixel 600 shown in FIG. 6 includes 9 transistors, 1 capacitor, and 1 OLED.

Referring to FIG. 6, the 9 transistor include a transistor 601, a transistor 602, a transistor 603, a transistor 604, a transistor 605, a transistor 606, a transistor 607, a transistor 608, and a transistor 609; the 1 capacitor includes a capacitor 611, and the 1 OLED includes an OLED 621. The transistors 601, 602, and 605 to 608 are p-type transistors, and the transistors 603, 604, and 609 are n-type transistors. The n-type transistor is an oxide transistor whose off leak current is very small. This helps to maintain the stored charge on the storage capacitor. Referring to FIG. 6, the transistors coupled to the storage capacitor (that is the capacitor 611) standing for leak current are by oxide transistor in n-type.

A source of the transistor 601 is coupled to a node 632 a drain of the transistor 601 is coupled to a node 633, and a gate of the transistor 601 is coupled to a node 631.

A source of the transistor 602 is coupled to a node 634, a drain of the transistor 602 is coupled to the node 632, and a gate of the transistor 602 is coupled to an input terminal EM, where the input terminal EM is configured to obtain an enable control signal arranged in the horizontal direction.

A source of the transistor 603 is coupled to the node 632, a drain of the transistor 603 is coupled to a node 635, and a gate of the transistor 603 is coupled to an input terminal S2N, where the input terminal S2N is configured to obtain a second control signal arranged in the horizontal direction.

A source of the transistor 604 is coupled to the node 635, a drain of the node 604 is coupled to an input terminal VINI1, and a gate of the transistor 604 is coupled to an input terminal S4N. The input terminal VINI1 is configured to obtain a first initial voltage, and the input terminal S4N is configured to obtain a fourth control signal arranged in the horizontal direction.

A source of the transistor 605 is coupled to the node 634, a drain of the transistor 605 is coupled to an input terminal VINI2, and a gate of the transistor 605 is configured to obtain S3N. The input terminal VINI2 is configured to obtain a second initial voltage.

A source of the transistor 606 is coupled to the node 633, a drain of the transistor 606 is coupled to an input terminal VINI3, and a gate of the transistor 606 is configured to obtain S3N. The input terminal VINI3 is configured to obtain a third initial voltage.

A source of the transistor 607 is configured to obtain PVDD, a drain of the transistor 607 is coupled to the node 633, and a gate of the transistor 607 is coupled to an input terminal EM, where the input terminal EM is configured to obtain an enable control signal arranged in the horizontal direction.

A source of the transistor 608 is coupled to the node 633, a drain of the transistor 608 is configured to obtain the data signal, and a gate of the transistor 608 is coupled to an input terminal S1N, where the input terminal S1N is configured to obtain a first control signal arranged in the horizontal direction.

A source of the transistor 609 is coupled to the node 631, a drain of the transistor 609 is coupled to the node 635, and a gate of the transistor 609 is configured to obtain the enable signal.

Compared with FIG. 4, the capacitor 611 is the capacitor 413 in FIG. 4, the transistor 609 is the transistor 411 in FIG. 4, and the transistor 608 is the transistor 412 in FIG. 4.

Similar to FIG. 5, FIG. 6 also illustrates the regular components and the additional component of the sub-pixel.

Figure 7:
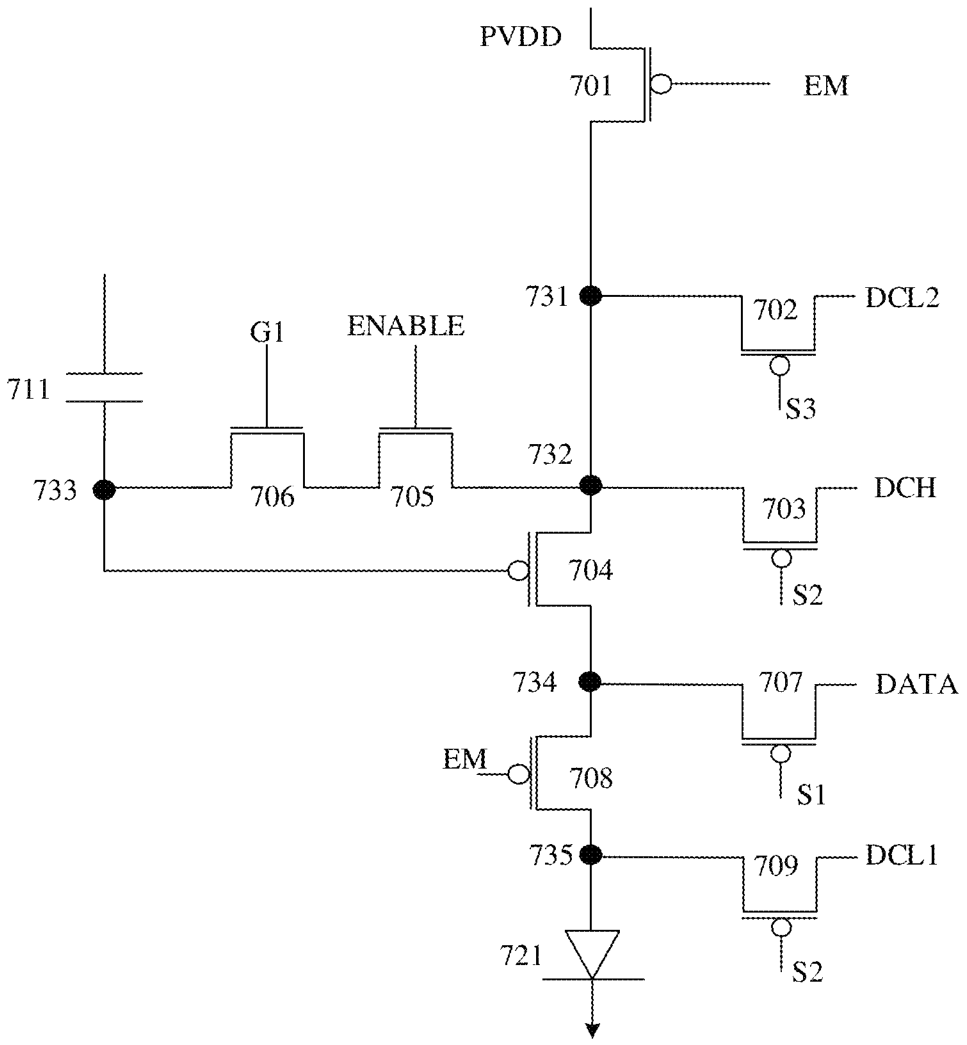
FIG. 7 illustrates a sub-pixel in accordance with some other embodiments of the present application.

FIG. 7 illustrates a sub-pixel in accordance with some other embodiments of the present application. The sub-pixel 700 includes 9 transistors, 1 capacitor and 1 OLED.

Referring to FIG. 7, the 9 transistors include a transistor 701, a transistor 702, a transistor 703, a transistor 704, a transistor 705, a transistor 706, a transistor 707, a transistor 708 and a transistor 709; the 1 capacitor includes a capacitor 711, and the 1 OLED includes an OLED 721. The transistors 701 to 704 and 707 to 709 are p-type transistors, and the transistors 705 and 706 are n-type transistors.

A source of the transistor 701 is coupled to a node 731, a drain of the transistor 701 is configured to obtain PVDD, and a gate of the transistor 701 is coupled to an input terminal EM, where the input terminal EM is configured to obtain an enable control signal arranged in the horizontal direction.

A source of the transistor 702 is coupled to the node 731, a drain of the transistor 702 is coupled to an input terminal DCL2, and a gate of the transistor 702 is coupled to an input terminal S3. The input terminal DCL2 is configured to obtain a second initial voltage, and the input terminal S3 is configured to obtain a third control signal arranged in the horizontal direction.

A source of the transistor 703 is coupled to a node 732, a drain of the transistor 703 is coupled to an input terminal DCH, and a gate of the transistor 703 is coupled to an input terminal S2. The input terminal DCH is configured to obtain a high initial voltage, and the input terminal S2 is configured to obtain a second initial voltage.

A source of the transistor 704 is coupled to a node 734, a drain of the transistor 704 is coupled to the node 732, and a gate of the transistor 704 is coupled to a node 733.

A source of the transistor 705 is coupled to a drain of the transistor 706, a drain of the transistor 705 is coupled to the node 732, and the gate of the transistor 705 is configured to obtain the enable signal.

A source of the transistor 706 is coupled to the node 733, and a gate of the transistor 706 is coupled to an input terminal G1, where the input terminal G1 is configured to obtain a gate scan control signal arranged in the horizontal direction.

A source of the transistor 707 is coupled to the node 734, a drain of the transistor 707 is configured to obtain the data signal, and a gate of the transistor 707 is coupled to an input terminal S1, where the input terminal is configured to obtain a first control signal arranged in the horizontal direction.

A source of the transistor 708 is coupled to a node 735, a drain of the transistor 708 is coupled to the node 734, and a gate of the transistor 708 is coupled to an input terminal EM, where the input terminal EM is configured to obtain an enable control signal arranged in the horizontal direction.

A source of the transistor 709 is coupled to the OLED 721, a drain of the transistor 709 an input terminal DCL 1, and a gate of the transistor 709 is coupled to the input terminal S2. The input terminal DCL 1 is configured to obtain a first initial voltage Compared with FIG. 4, the capacitor 711 is the capacitor 413 in FIG. 4, the transistor 705 is the transistor 411 in FIG. 4, and the transistor 707 is the transistor 412 in FIG. 4. Similar to FIG. 5 and FIG. 6, FIG. 7 also illustrates the regular components and the additional component of the sub-pixel.

Referring to FIG. 1, in some embodiments, if the pixel array 110 includes X rows and Y columns sub-pixels (that is, the pixel array 100 includes X*Y sub-pixels), the data driver circuit 130 may include X*Y terminals for outputting the enable signal. The X*Y terminals are in one-to-one correspondence with the X*Y sub-pixels. The sub-pixel obtains the enable signal from the corresponding terminal.

In some other embodiments, the data driver circuit 130 may only include one terminal for outputting the enable signal. For convenience, the terminal for outputting the enable signal may be referred to as a first output terminal. In these embodiments, the AMOLED display may further include an enable signal acquisition circuit. The enable signal acquisition circuit is configured to obtain the enable signal according to the first output terminal and output the enable signal to at least one sub-pixel of the plurality sub-pixels.

In some embodiments, the AMOLED display may include M first signal lines, and the enable signal acquisition circuit includes M enable signal acquisition units, M is a positive integer greater than 1. The M first signal lines are in one-to-one correspondence with the M enable signal acquisition units. In some embodiments, each of the M first signal lines corresponds to one column of sub-pixel. In some embodiments, each of the M first signal lines corresponds to two or more columns of sub-pixel. Each of the columns of sub-pixels includes at least one sub-pixels. In other words, each of the M first signal lines corresponds to at least one sub-pixel. In some embodiments, each of the M first signal lines corresponds to a partial sub-pixels in one column, e.g., one first signal line may correspond to ½ of the sub-pixels in one column, ⅓ of the sub-pixels in one column, or the like. Therefore, each of the M enable signal acquisition units can transmit the enable signal to the at least one sub-pixel through the corresponding first signal line.

In some embodiments, the first output terminal of the data driver circuit may output serial enable data signal, and the enable signal acquisition circuit may convert the serial enable data signal to M parallel enable data signals and output M parallel enable signals to the M first signal lines.

For example, in some embodiments, each of the M enable signal acquisition units may include a first sub-unit. The first sub-unit is configured to obtain the serial enable data signals and convert the serial enable data signals to the enable data signal of a corresponding first signal line.

In some embodiments, the first sub-unit may include any one of the followings: a shift register, a serial input to parallel outputs (SIPO) conversion circuit, and the like.

In some embodiments, the first output terminal may only be configured to output the serial enable data signals. In this situation, the first output terminal may also be referred to as an enable signal output terminal or an enable terminal. Meanwhile, the data driver circuit may further include a terminal configured to output the display data signal, and this terminal may be referred to as a display data signal output terminal or a display data terminal.

In some other embodiments, the first output terminal may be configured to output both the serial enable data signals and the display data signals. A group of serial enable data signals may correspond to display data signals of a frame, and the group of the serials enable data signals is used for enabling or disabling sub-pixels according to the corresponding display data signals. For example, it is assumed that the AMOLED includes 4 sub-pixels, a sub-pixel A, a sub-pixel B, a-pixel C, and sub-pixel D. For a frame A, only the sub-pixel A and the sub-pixel B need to be lighten. Therefore, a group of serial enable data signals may include two enable data signals for enabling the sub-pixel A and the sub-pixel B and two enable data signals for disabling the sub-pixel C and the sub-pixel D. Sometimes, in order to distinguish the enable data signal for enabling the sub-pixel and the enable data signal for disabling the sub-pixel, the enable data signal for enabling the sub-pixel may be referred to as a first enable data signal, and the enable data signal for disabling the sub-pixel may be referred to as a second enable data signal. In some situation, the second enable data signal may also be referred to as a disable data signal. Correspondingly, the first enable data signal also be referred to as an enable data signal. However, the term "enable data signal" mentioned in the present application is used to indicate the first enable data signal and/or the second enable data signal unless otherwise indicated.

In some embodiments, when the data driver circuit uses the same terminal to output the enable data signals and the display data signals, the data driver circuit may output the serials enable data signals first, and then output the corresponding display data signal. For example, it is assumed that the AMOLED is going to display three frames (a frame A, a frame B, and a frame C). For convenience, display data signals of the frame A may be referred to as DATA A, a group of serial enable data signals corresponds to DATA A may be referred to as EN A, display data signals of the frame B may be referred to as DATA B, a group of serial enable data signals corresponds to DATA B may be referred to as EN B, display data signals of the frame C may be referred to as DATA C, and a group of serial enable data signals corresponds to DATA C may be referred to as EN C. In some embodiments, the first output terminal may output the enable data signals and the display data signals in the following order: EN A, DATA A, EN B, DATA B, EN C, and DATA C. In this case, the enable signal acquisition circuit needs to store the enable data signals first, wait for the data driver circuit to send the display data signals corresponding to the enable data signals, and send enable signals corresponding to the stored enable data signals together with the corresponding display data signals to the corresponding sub-pixel when the driver has sent the display data signals. Each of the enable signal acquisition units may include a second sub-unit for storing the enable data signals. Similar to the enable data signal, the display data signal output by the first output terminal may also be in a serial form. The first sub-unit may be further configured to obtain serial display data signals and convert the serial display data signals to parallel display data signals. The second sub-unit may be configured to send both the display data signal of a corresponding second signal line and the enable signal of a corresponding first signal line to at least one sub-pixel.

In some other embodiments, when the display data signal and the enable data signal are output by the same terminal of the data driver circuit, the first output terminal may first output the display data signals, and then output the corresponding enable data signal. In this situation, the second sub-unit may be configured to store the display data signal and transmit the display data signal together with the corresponding enable signals to the sub-pixels FIG. 8 schematically illustrates an enable signal acquisition circuit in accordance with some embodiments of the present application.

Figure 8:
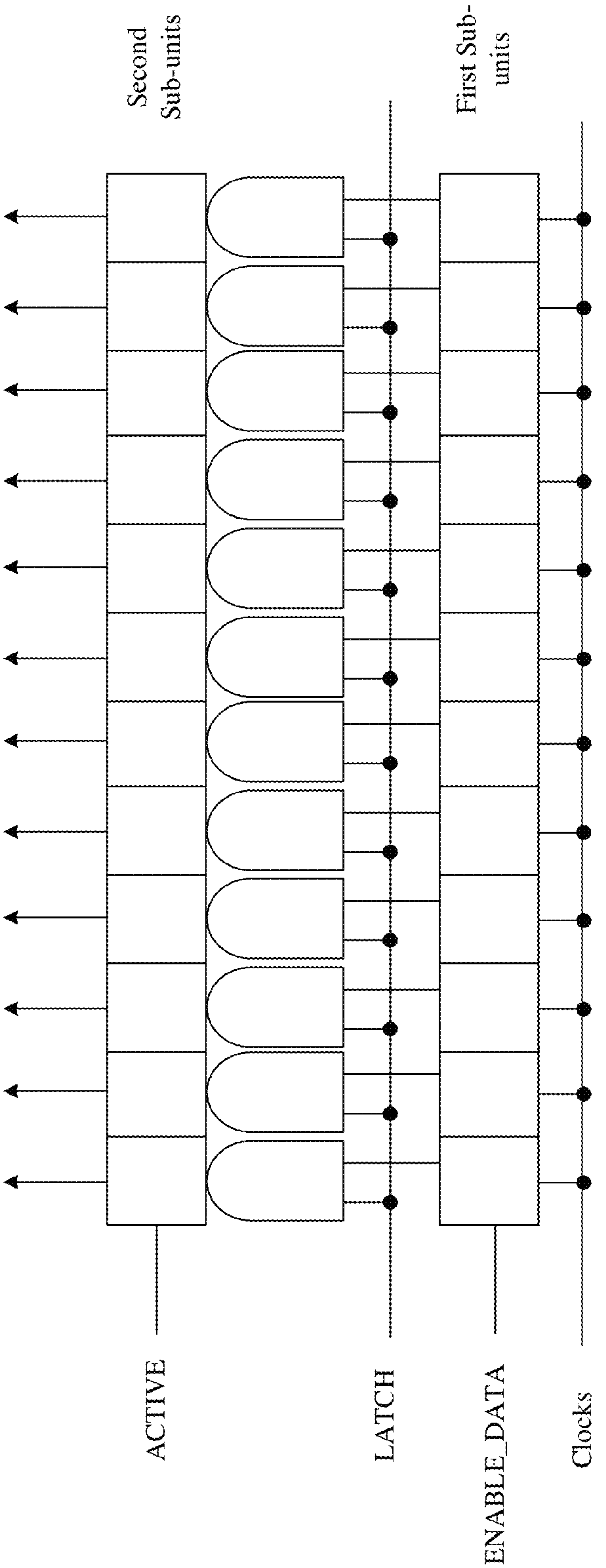
FIG. 8 schematically illustrates an enable signal acquisition circuit in accordance with some embodiments of the present application.

FIG. 8 illustrates a plurality of first sub-units, and a plurality of second sub-units. Referring to FIG. 8, the first sub-units convert the serial signals to parallel signals and transmit the parallel signals to the second sub-units. Except to obtain the enable signals from the data driver circuits, the first sub-units further receive clock signals from the data driver circuit. The first sub-units convert the serials signals to the parallel signals in accordance with the clock signals. The second sub-units and the first sub-units are in one-to-one correspondence. The second sub-units receive converted signals from the corresponding first sub-units. Besides the converted signals obtained from the corresponding first sub-units, the second sub-units further receives a first control signal from the data driver circuit. In some embodiments, the first control signal may include an active signal and a latch signal. The second sub-units store and output the enable signal in accordance with the active signal and the latch signal.

Figure 9:
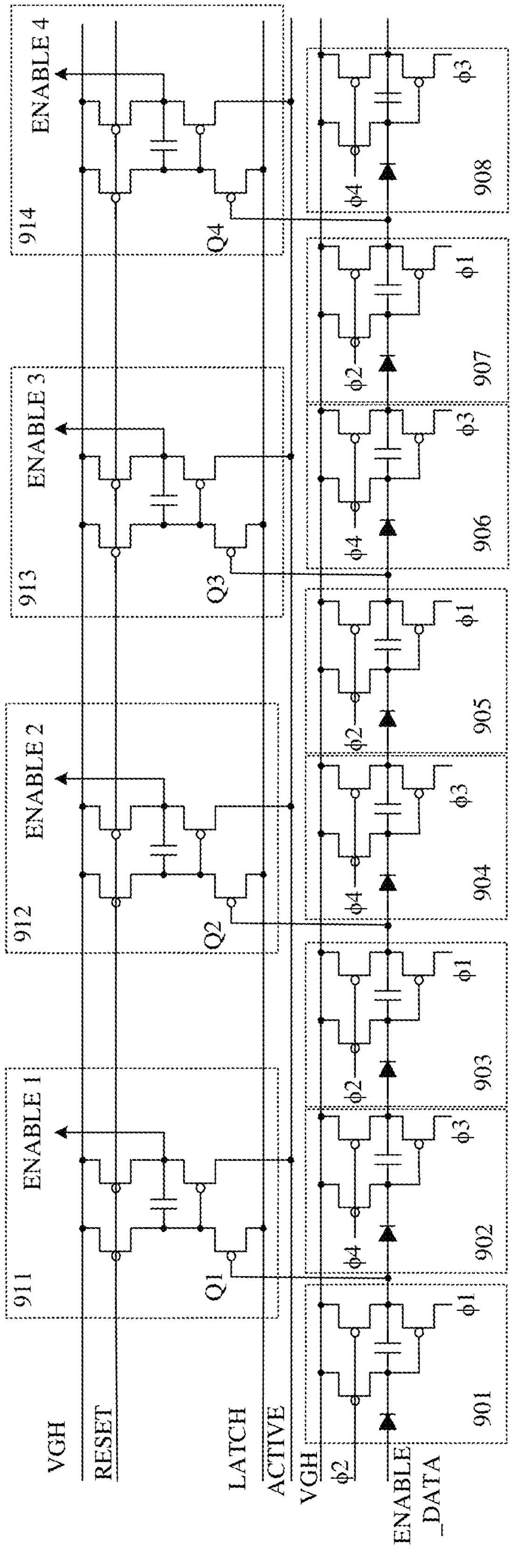
FIG. 9 illustrates an example of the enable signal acquisition circuit of FIG. 8.

FIG. 9 illustrates an example of the enable signal acquisition circuit of FIG. 8.

Referring to FIG. 9, the enable signal acquisition circuit includes a shift register 901, a shift register 902, a shift register 903, a shift register 904, a shift register 905, a shift register 906, a shift register 907, a shift register 908, a storage register 911, a storage register 912, a storage register 913, and a storage register 914.

The storage registers illustrated in FIG. 9 are the second units. In other words, FIG. 9 illustrates four second units, that is, the storage register 911, the storage register 912, the storage register 913, and the storage register 914. Therefore, the storage register 911 may also be referred to as a second sub-unit 911, the storage register 912 may also be referred to as a second sub-unit 912, the storage register 913 may also be referred to as a second sub-unit 913, and the storage register 914 may also be referred to as a second sub-unit 914. One first sub-unit of the enable signal acquisition unit includes one or more shift registers. For example, a first sub-unit corresponding to the second sub-unit 911 may include the shift register 901, a first sub-unit corresponding to the second sub-unit 912 may include the shift register 902 and the shift register 903, a first sub-unit corresponding to the second sub-unit 913 may include the shift register 904 and the shift register 905, and a first sub-unit corresponding to the second sub-unit 914 may include the shift register 906 and the shift register 907.

Further, referring to FIG. 9, four clock signals are applied to the shift registers. For example, a first clock signal ϕ1 and a second clock signal 2 are applied to the shift register 901, the shift register 903, the shift register 905, and the shift register 907; a third clock signal ϕ3 and a fourth clock signal ϕ4 are applied to the shift register 902, the shift register 904, the shift register 906, and the shift register 908. Further, a high voltage (VGH) signal is applied to the shift registers and the storage registers, a reset signal is applied to the storage registers, a latch signal is applied to the storage registers, and an active signal is applied to the storages registers. Therefore, for the enable signal circuits shown in FIG. 9, the data driver circuit includes 8 terminals, the first output terminal configured to output the serial enable data signals, a high voltage terminal configured to output the VGH signal, a reset terminal configured to output the reset signal, an active terminal configured to output the active signal, a latch terminal configured to output the latch signal, and four clock terminals configured to output the clock ϕ1 to the clock ϕ4 respectively. Further, if a terminal for outputting the display data is different from the terminal for outputting the enable data signals, the data driver circuit may further include a plurality of terminals for outputting the display data, where each of the plurality of terminals is corresponding to at least one sub-pixel and outputs the display data to the corresponding sub-pixel. If a terminal for outputting the display data is identical to the terminal for outputting the enable data signals, the first output terminal may also be configured to output the display data signals.

A capacitor in the storage register is used to store the enable signal obtained from the corresponding shift register(s). A capacitor in the shift register and a transistor coupled to the first clock signal ϕ1 consists a bootstrapping circuit.

Figure 10:
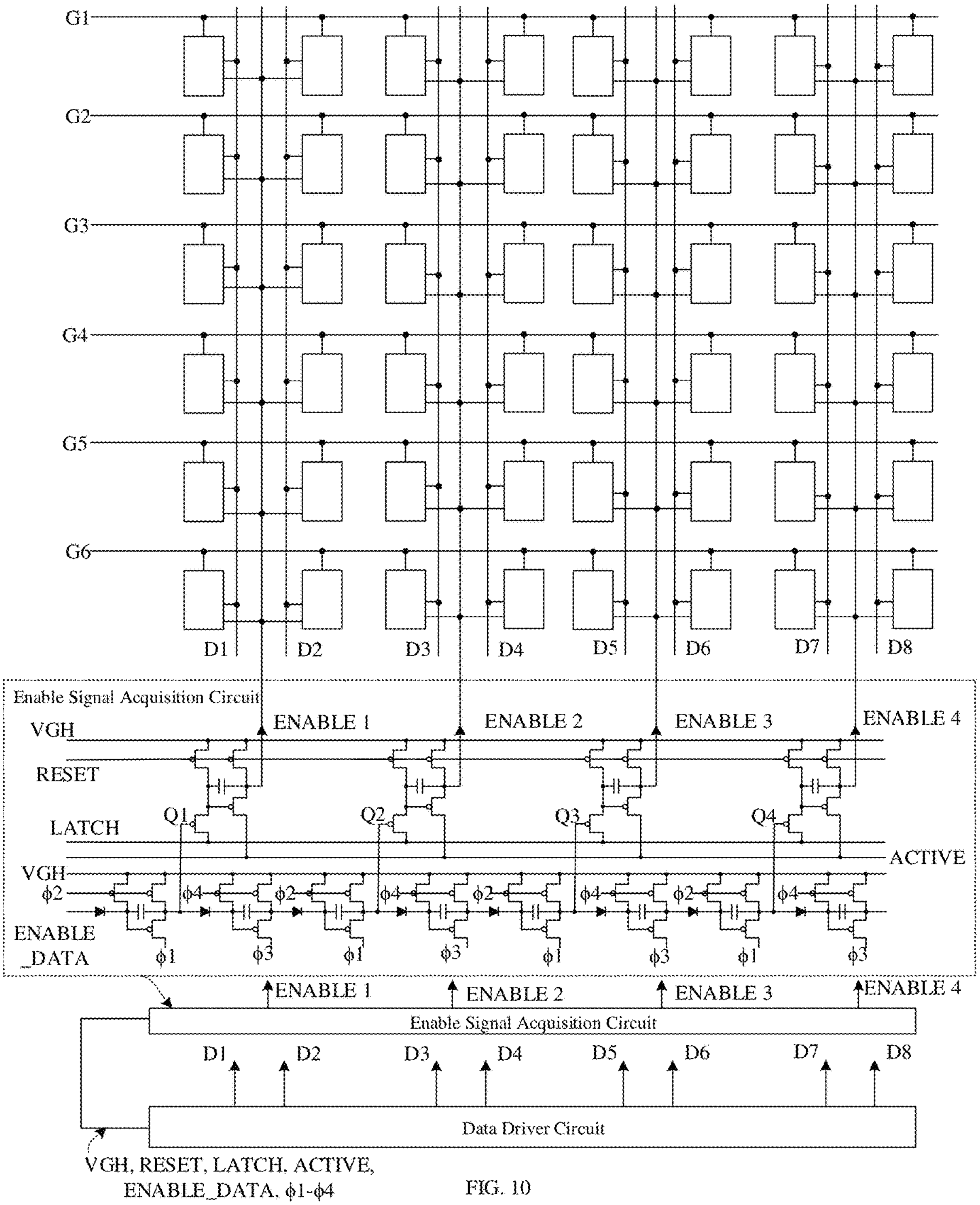
FIG. 10 illustrates an array of sub-pixels corresponding to the enable signal acquisition circuit of FIG. 9.

FIG. 10 illustrates an array of sub-pixels corresponding to the enable signal acquisition circuit of FIG. 9.

Referring to FIG. 10, the four storage registers are in one-to-one correspondence with four first signal lines. Each of the four first signal lines corresponds two columns of the sub-pixel. Further, each column of the sub-pixel corresponds to one second signal line. The display data signals are transmitted through the second signal lines to the corresponding sub-pixels. As an example, 8 display data terminal of the data driver circuit output the display data signals D1 to D8 respectively. For convenience, a display data terminal configured to output the display data signal D1 is referred to as a terminal D1, a display data terminal configured to output the display data signal D2 is referred to as a terminal D2, and so on. Each of the 8 display data terminals is coupled to a second signal line. Similarly, for convenience, a second signal line coupled to the terminal D1 is referred to as a second signal line D1, a second signal line coupled to the terminal D2 is referred to as a second signal line D2, and so on. The display data signal D1 is output from the terminal D1 and send to at least one sub-pixel over the second signal line D1, the display data signal D2 is output from the terminal D2 and send to at least one sub-pixel over the second signal line D2, and so on.

In some embodiments, since the first signal lines are used to transmit the enable signals, the first signal lines are also referred to as enable lines. Similarly, the second signal lines may be referred to as data lines as the second signal lines are used to transmit the data signals.

FIG. 10 further illustrates several third signal lines. The third signal line are used to transmit the gate control signal. Therefore, the third signal line may be referred to as a gate line.

Referring to FIG. 10, the gate lines are arranged in the gate direction and the enable lines are arranged in the data direction. Therefore, each of the sub-pixels may obtain the gate control signal in the gate direction and the enable signal in the data direction. Therefore, the sub-pixel array may be divided into several blocks by the gate control signal in the gate direction and the enable signal in the data direction.

Figure 11:
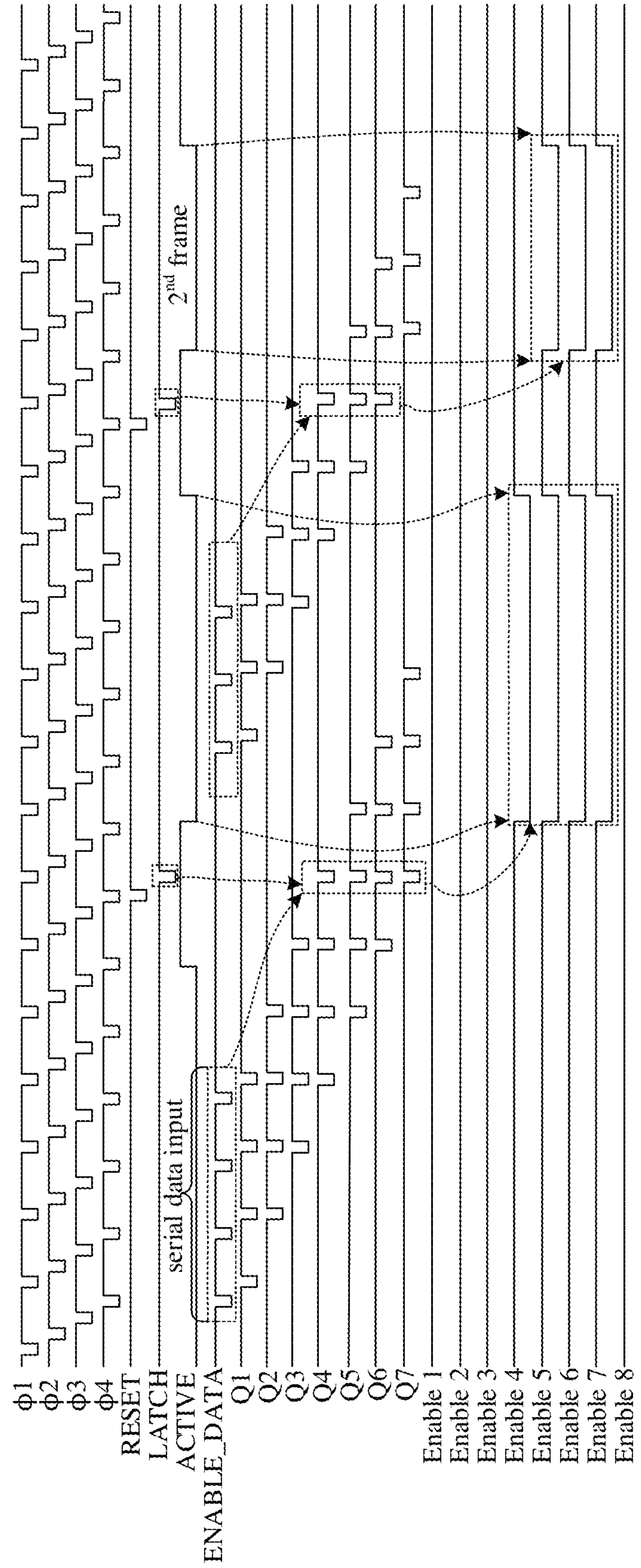
FIG. 11 illustrates a time chart corresponding to the enable signal acquisition circuit of FIG. 8.

FIG. 11 illustrates a time chart corresponding to the enable signal acquisition circuit of FIG. 8.

The pulses Qx are the shift register pulses of input ENABLE_DATA shifted with synced with the clock signal ϕ1. Referring to FIG. 10, the serial enable data input includes four pulses, so the number of enable outputs parallel pulses are also four. The latch signal is to latch those internal signal Qx and transfer to the storage register. Then once the active signal comes to the storage register, then the enable outputs (ENABLEx) are activated according to the input serial data. The pulse width of the active signal corresponds to the row number and its position to be enabled and updated (rows as movie). If the rows in movie is large, the pulse width of active gets wide (i.e. the first frame), while the movie is small then the pulse width gets narrower (i.e. the second frame) respectively.

Figure 12:
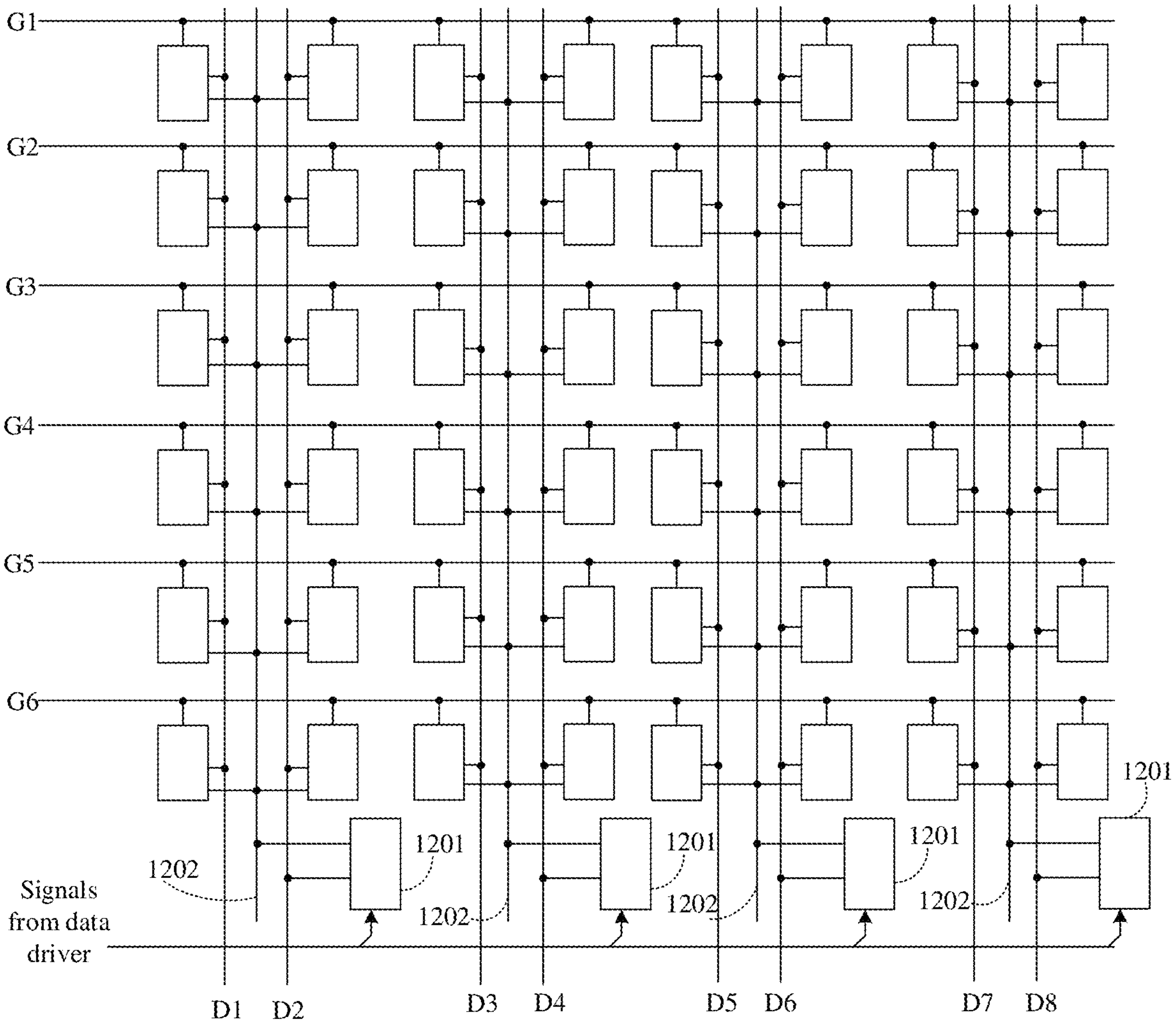
FIG. 12 shows an enable signal acquisition circuit and the corresponding first signal lines in accordance with some other embodiments of the present application.

FIG. 12 shows an enable signal acquisition circuit and the corresponding first signal lines in accordance with some other embodiments of the present application.

Referring to FIG. 12, the enable signal acquisition circuit includes four enable signal acquisition units 1201. Each of the four enable signal acquisition units 1201 obtains enable signals from the data driver circuit and outputs the enable signals to the corresponding first signal line 1202. Each of the four first signal lines 1202 is coupled to the enable terminal of multiple sub-pixels. Therefore, the multiple sub-pixels may obtain the enable signals from the enable signal acquisition circuit through the first signal line.

Figure 13:
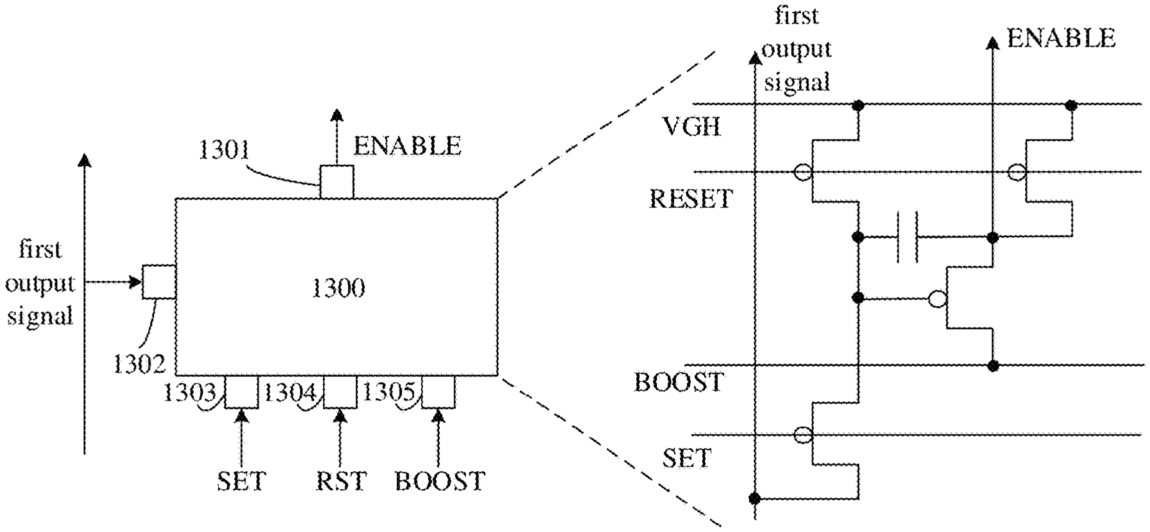
FIG. 13 is a structure diagram of the enable signal acquisition unit.

FIG. 13 is a structure diagram of the enable signal acquisition unit. As shown in FIG. 13, the enable signal acquisition unit 1300 includes 5 terminals, a terminal 1301, a terminal 1302, a terminal 1303, a terminal 1304, and a terminal 1305.

The terminal 1301 is an output terminal configured to output the enable signal.

The terminal 1302 is an input terminal configured to obtain the first output signal from the data driver circuit.

The terminal 1303, the terminal 1304, and the terminal 1305 are configured to obtain control signals. More specifically, the control signals include a set signal, a reset (RST) signal, and a boost signal. The terminal 1303 is configured to obtain the set signal, the terminal 1304 is configured to obtain the RST signal, and the terminal 1305 is configured to obtain the boost signal. In some embodiments, the set signal may be referred to as a first control signal, the RST signal may be referred to as a second control signal, and the boost signal may be referred to as a third control signal.

The enable signal is determined according to the first output signal and the set signal. For example, in some embodiments, if the set signal is a high voltage signal, the terminal 1301 may output signals obtained from the terminal 1302. In contrast, if the set signal is a low voltage signal, the enable signal acquisition unit 1300 may ignore the signals obtained from the terminal 1302. In other words, when the set signal is the low voltage signal, the terminal 1301 may not output any signal.

FIG. 13 also shows a circuit of the enable signal acquisition unit 13.

Referring to FIG. 13, the enable signal acquisition unit includes a bootstrapping circuit. The bootstrapping unit may push up/down the enable signal obtained from the first output signal.

Figure 14:
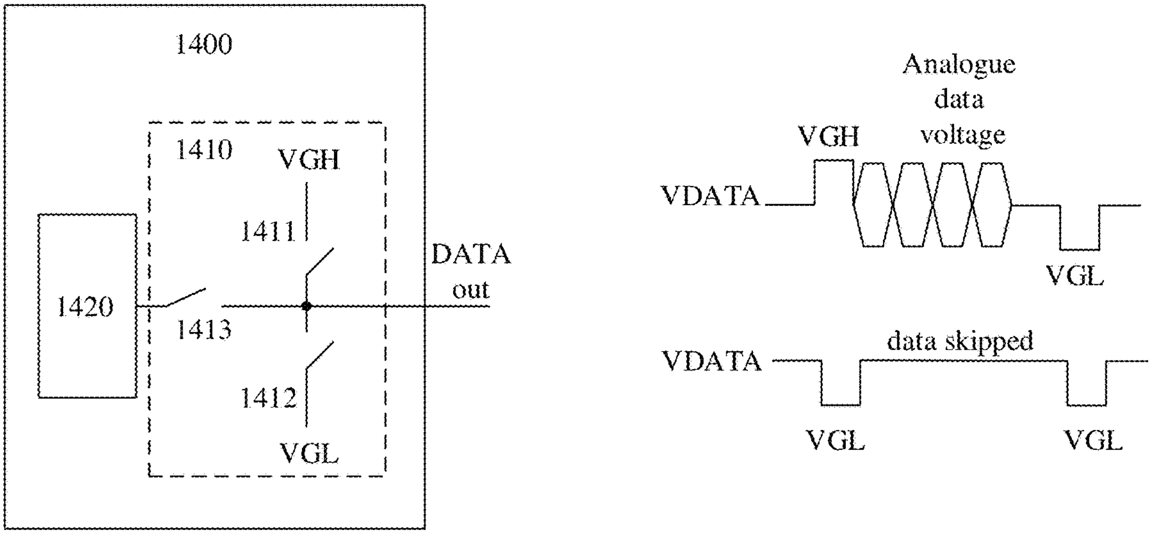
FIG. 14 shows a structure diagram of the data driver circuit provided by the embodiment of the present application.

FIG. 14 shows a structure diagram of the data driver circuit provided by the embodiment of the present application.

FIG. 14 only shows a switch unit of the data driver circuit. Except the switch unit, the rest circuit 1420 of the data driver circuit may be the same as the data driver circuit in the prior art.

As shown in FIG. 14, the switch unit 1410 includes three switches, a switch 1411, a switch 1412, and a switch 1413. The three switches control the data driver circuit 1400 to output the high voltage signal, the low voltage signal, or the analogue data voltage signal.

For example, if the switch 1411 is closed and the switches 1412 and 1413 are opened, the first output data signal may be the high voltage signal; if the switch 1412 is closed and the switches 1411 and 1413 are opened, the first output data signal may be the low voltage signal; if the switch 1413 is closed and the switches 1411 and 1412 are opened, the first output data signal may be the analogue data voltage signal. The high voltage signal and the low voltage signal are the first enable signal and the second enable signal. The analogue data voltage signal is the display data signal.

The set signal for controlling the enable signal acquisition unit shown in FIG. 13 corresponds to the first output signal. For example, if the first output signal data is the high voltage signal or the low voltage signal, the set signal may control the terminal 1301 output the data obtained from the data driver circuit; if the first output signal data is the analogue data voltage signal, the set signal may control the enable signal acquisition unit ignore the signal obtained from the data driver circuit.

In some embodiments, all first signal lines in the AMOLED display obtain the enable signal from the corresponding enable signal acquisition unit.

In some embodiments, a part of the first signal lines in the AMOLED display obtain the enable signal from the corresponding enable signal acquisition unit, and the other enable liens obtain the enable signal from the data driver circuit.

Figure 15:
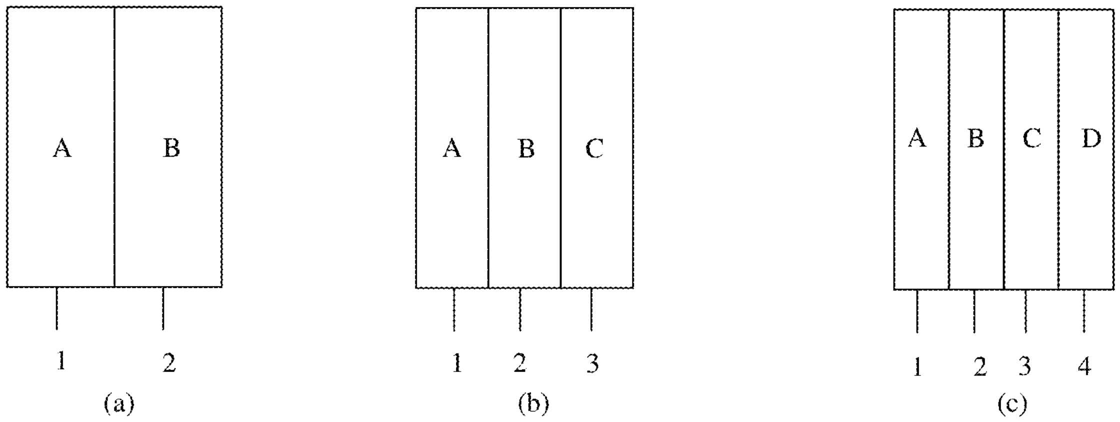
FIG. 15 illustrates a pixel array provided by the embodiment of the present application.

As shown in FIG. 15 (*a*), the pixel array is divided into two areas, area A and area B. The first signal lines in the area A obtain the enable signal from the enable signal acquisition circuit, and the first signal lines in the area B obtain the enable signal from the data driver circuit.

As shown in FIG. 15 (*b*), the pixel array is divided into three areas, area A, area B, and area C. In some embodiments, the first signal lines in the area A and the area C obtain the enable signal from the enable signal acquisition circuit, and the first signal lines in the area B obtain the enable signal from the data driver circuit. In some other embodiments, the first signal lines in the area B obtain the enable signal from the enable signal acquisition circuit, and the first signal lines in the area A and the area C obtain the enable signal from the data driver circuit.

As shown in FIG. 15 (*c*), the pixel array is divided into four areas, area A, area B, area C and area D. In some embodiments, the first signal lines in the area A and the area C obtain the enable signal from the enable signal acquisition circuit, and the first signal lines in the area B and the area D obtain the enable signal from the data driver circuit. In some other embodiments, the first signal lines in the area B and the area D obtain the enable signal from the enable signal acquisition circuit, and the first signal lines in the area A and the area C obtain the enable signal from the data driver circuit.

In some embodiments, the enable signal acquisition circuit and the data driver circuit are arranged on the same side of the pixel array.

In some embodiments, the enable signal acquisition circuit is arranged opposite side to the data driver circuit. For example, the enable signal acquisition circuit may be at the top side of the pixel array, and the data driver circuit may be at the bottom side of the pixel array.

In accordance with the present application, the sub-pixels may be activated or deactivated according to both the gate control signal in the gate direction and the enable signal in the data direction. Therefore, an active area may be an area that displays dynamic data (e.g., movies, dynamic images, or the like). Since each of the gate control signals is configured to control states of sub-pixels belonging to one or more rows of the sub-pixel array and each of the enable signals is configured to control states of sub-pixels belonging to one or more columns of the sub-pixel array, an area activated by the gate control signals and the enable signals always has a shape of rectangular. Therefore, the area activated by the gate control signals and the enable signals may be referred to as a movie box, while the area other than the movie box may be referred to as a still box, a still area or a still image. A refresh rate of the movie box may be different from that of the still box. For example, the refresh rate of the movie box may be 120 Hz, and the refresh rate of the still box may be 1 Hz. Therefore, the area that belongs to the still box does not need to be updated, while the area that belongs to the movie box needs to be updated for displaying the dynamic data.

In some embodiments, the active area may be the same as the movie box. In some other embodiments, the movie box may be bigger than the active area.

Figure 16:
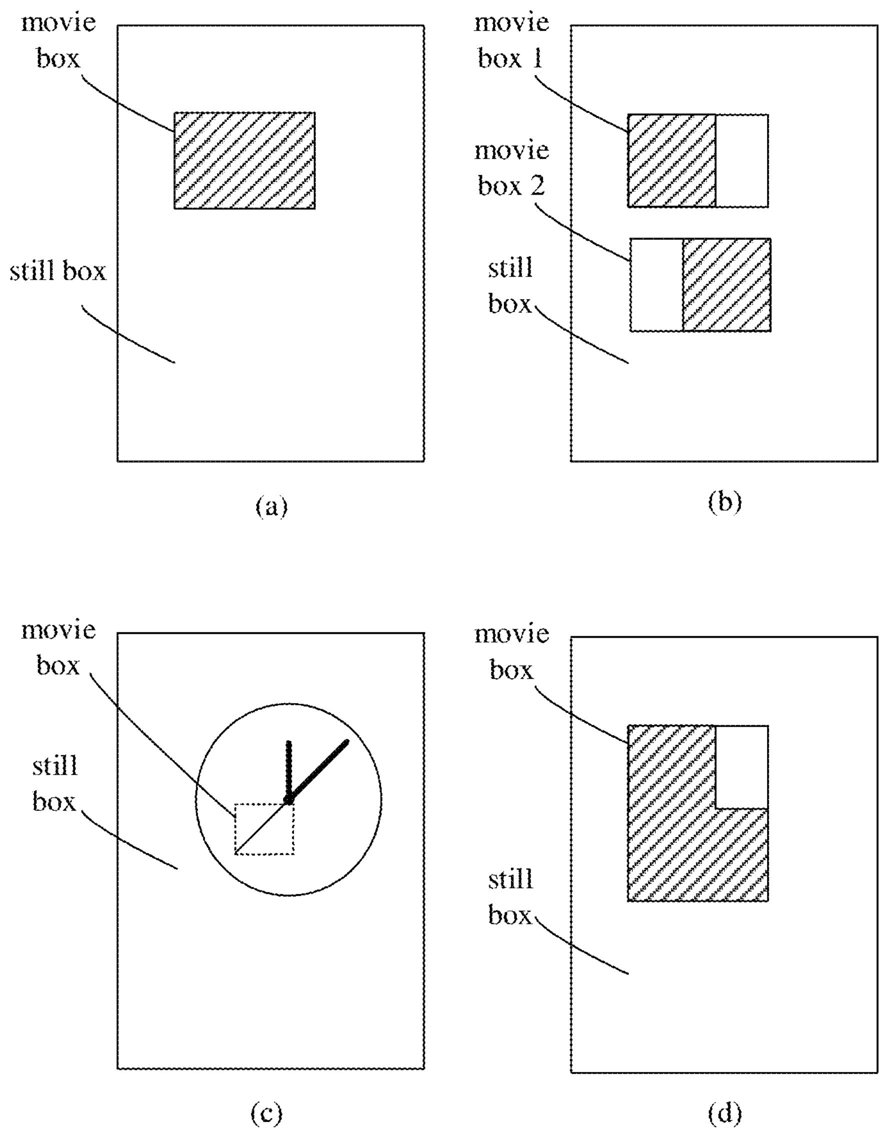
FIG. 16 illustrates examples of the movie box and still box.

FIG. 16 illustrates examples of the movie box and still box.

FIG. 16(*a*) illustrates one movie box and one still box. Referring to FIG. 16(*a*), the shadowed area is the active area, and the active area is identical to the movie box.

FIG. 16(*b*) illustrates two movie boxes and one still box. Referring to FIG. 16(*b*), the shadowed area is the active area, and the movie box is bigger than the active area since the enabled column should be logical OR of both active area. In other words, when the display area includes multiple active areas, the width of the enable column is the logical OR for the width of the multiple active areas.

FIG. 16(*c*) illustrates one movie box and one still box. FIG. 16(*c*) illustrates a clock, and the area of the second hand needle of the clock is the active area. Referring to FIG. 16(*c*), the movie box is bigger than the second hand needle. The movie box corresponding to the second hand needle is defined by a minimum rectangular enclosing the entire needle. In other words, when a shape of active area is irregular, the width of the enable column is the logical minimum for the width of the irregular active area.

FIG. 16(*d*) illustrates one movie box and one still box. FIG. 16(*c*) illustrates another irregular shaped active area. Referring to FIG. 16(*c*), the movie box corresponding to the second hand needle is defined by a minimum rectangular enclosing the active area.

According to the present application with arbitrary pixel block drive, the power consumption is minimized depending on the area ratio in still image and movie image.

Figure 17:
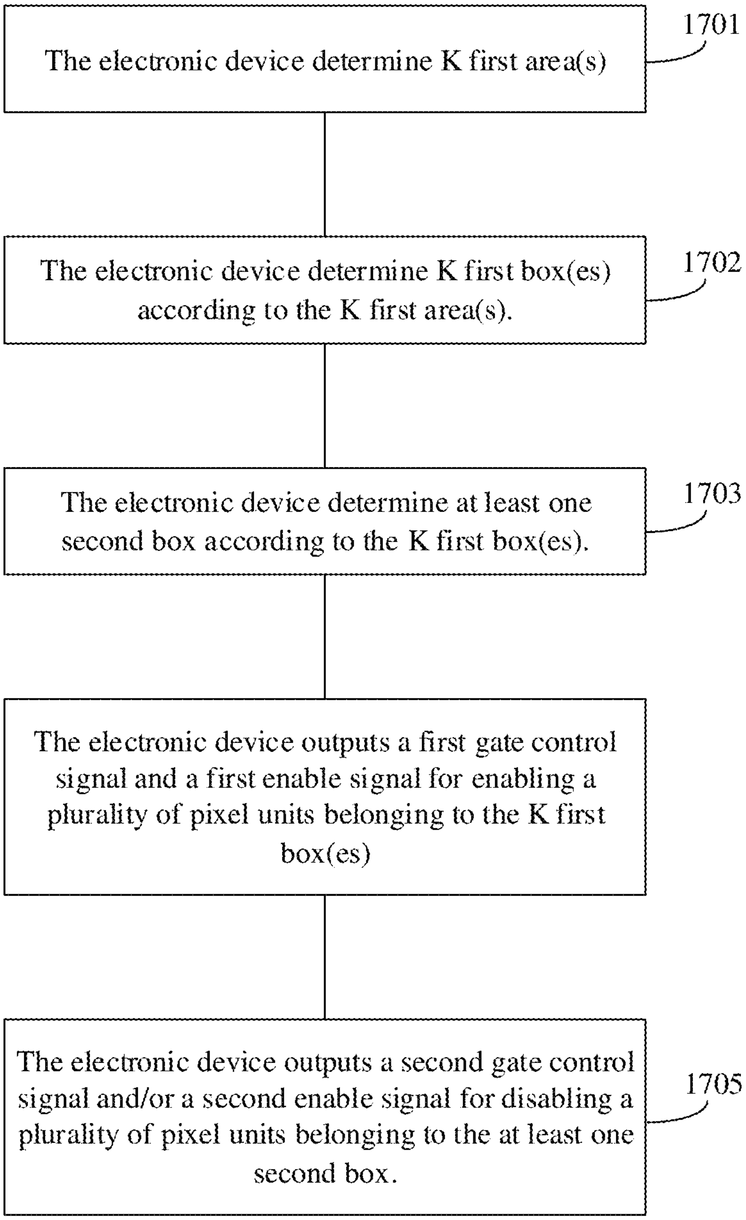
FIG. 17 illustrates a flowchart of an embodiment method for displaying.

FIG. 17 illustrates a flowchart of an embodiment method for displaying. The method may be performed by an electronic device including the above-mentioned display or one or more components of the electronic device. For convenience, it is assumed that the method shown in FIG. 17 is performed by the electronic device.

1701, The electronic device determine K first area(s).

The first area is used to display dynamic data. K is a positive integer greater than or equal to one. The first area may also be referred to as an active area.

1702, The electronic device determine K first box(es) according to the K first area(s).

Each of the K first box(es) is in one-to-one correspondence with the K first area(s).

1703, The electronic device determine at least one second box according to the K first box(es).

In some embodiments, the first box may also be referred to as a move box, and the second box may also be referred to as a still box.

1703, The electronic device outputs a first gate control signal and a first enable signal for enabling a plurality of pixel units belonging to the K first box(es).

1704, The electronic device outputs a second gate control signal and/or a second enable signal for disabling a plurality of pixel units belonging to the at least one second box.

A pixel unit in a display of the electronic device may be control by a gate control signal and an enable signal. The gate control signal controls the pixel unit in the gate direction, and the enable signal controls the pixel unit in the data direction. States of switches in the pixel unit and data stored by capacitor in the pixel units may be controlled by the gate control signal and the enable signal. The first gate control signal and the first enable signal are used to enable the pixel unit, and the second gate control signal and the second enable signal are used to disable the pixel unit. When the pixel unit receives both the first gate control signal and the first enable signal, the pixel unit may be refreshed in a high refresh rate (e.g., 120 Hz), and the pixel unit may be used to show dynamic data (e.g., movies, dynamic images, or the like). When the pixel unit receives at least one of the second gate control signal and the second enable signal, the pixel unit may be refreshed in a low refresh rate (e.g., 1 Hz), and the pixel unit may be used to show still data (e.g., images, text, or the like).

In some embodiments, when K is equal to one, the K first box(es) is a minimum rectangular enclosing the K first area(s).

In some embodiments, when K is greater than one and the K first area(s) overlap each other in a gate direction, an side length of each of the K first box(es) in the gate direction is equal to a logical or result of side lengths of the K first box(es) in the gate direction.

In some embodiments, when K is greater than one and the K first area(s) overlap each other in a data direction, an side length of each of the K first box(es) in the data direction is equal to a logical or result of side lengths of the K first box(es) in the data direction.

Figure 18:
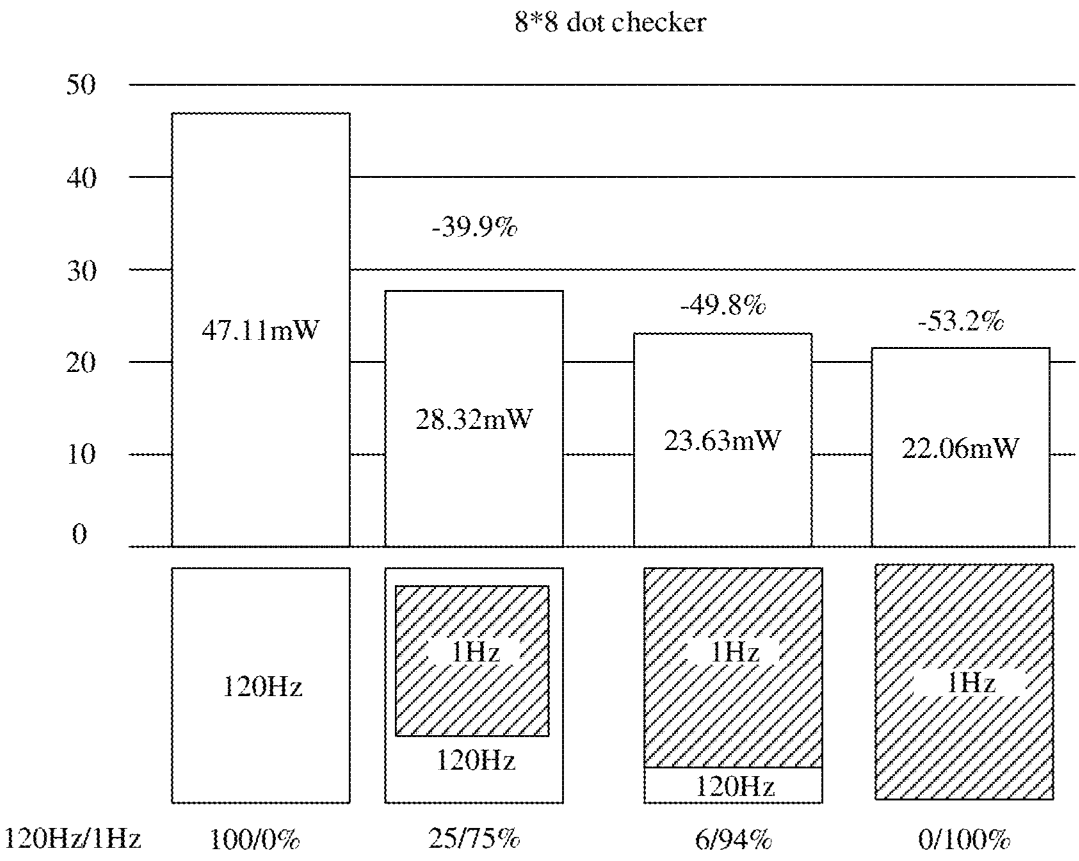
FIG. 18 illustrates a power simulation result in 8*8 dot checker.

FIG. 18 illustrates a power simulation result in an 8*8 dot checker.

Figure 19:
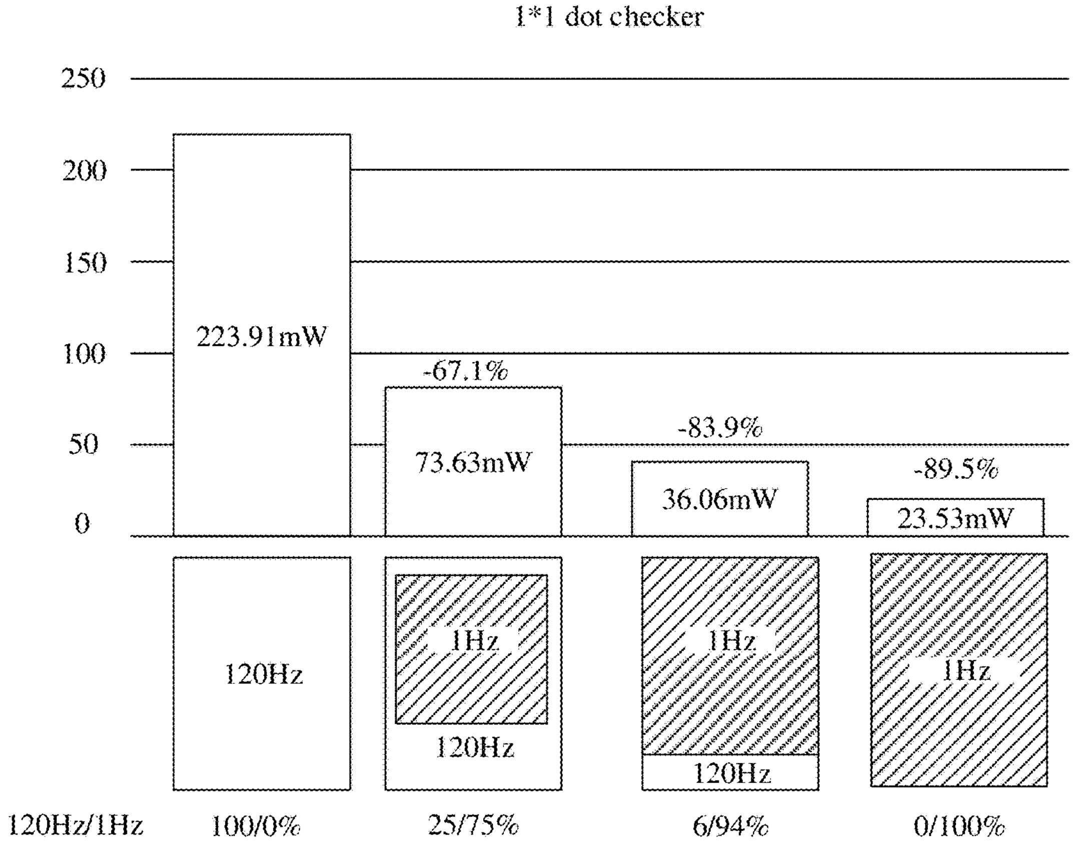
FIG. 19 illustrates a power simulation result in 1*1 dot checker.

FIG. 19 illustrates a power simulation result in a 1*1 dot checker.

Referring to FIG. 18 the power is reduced by 39.9% in the case of 1 Hz display area ratio in 75% for example.

Displaying data comes from an external system such as central processing unit (CPU) or graphics processing unit (GPU). As an example, in mobile phones, a mobile industry processor interface (MIPI) interface consists of several pairs of differential signal lines electrically driven by an amplifier located in a transmitter located in the system. Since the data speed of such interface is extremely fast, the power consumed by the transmitter is not negligibly small.

Figure 20:
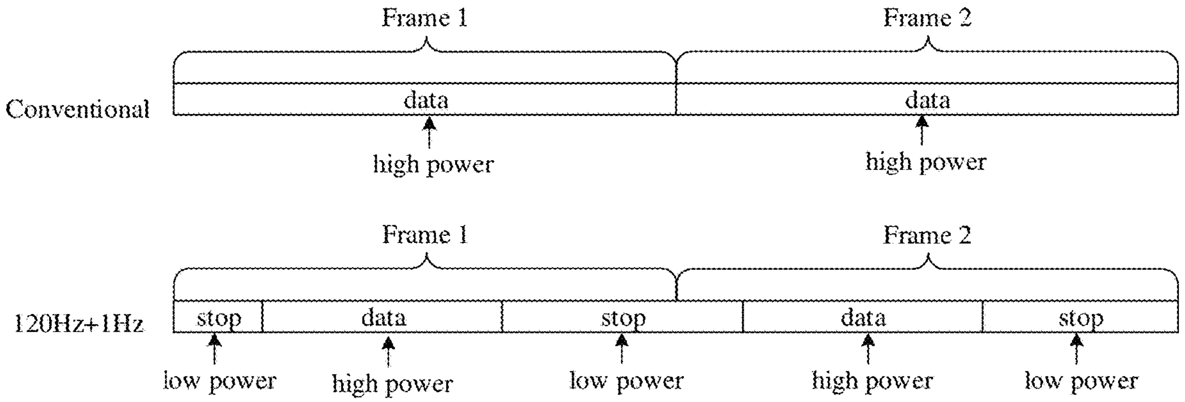
FIG. 20 illustrates a power consumption comparison between the present application and the conventional solution.

FIG. 20 illustrates a power consumption comparison between the present application and the conventional solution.

Referring to FIG. 20, according to the present application, the part of display data transaction can be stopped by the thanks of enable/disable function to maintain the sub-pixel, the interface power can be also reduced.

An embodiment of the present application further provides an electronic device. The electronic device includes the above-mentioned display panel. The electronic device may be a smartphone, a tablet, a smart-watch, a television among others.

An embodiment of the present application further provides a sub-pixel array. The sub-pixel array includes a plurality of sub-pixels described above.

It may be clearly understood by a person skilled in the art that, for the purpose of convenient and brief description, for a detailed working process of the foregoing system, apparatus, and unit, refer to a corresponding process in the foregoing method embodiment. Details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of the present application may be integrated into one processing unit, or each of the units may exist alone physically, or two or more units are integrated into one unit.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. An electronic device, comprising:
- a display, comprising:
- a plurality of pixels arranged in gate and data directions forming an array structure;
- an enable signal acquisition circuit; and
- a data driver circuit, comprising a first output terminal, wherein:
  - each of the plurality of pixels comprises a first input terminal, a second input terminal, and a third input terminal;
  - each first input terminal is configured to receive an enable signal from an enable line in the data direction,
  - each second input terminal is configured to receive a gate control signal from a gate line in the gate direction,
  - each third input terminal is configured to receive a display data signal from a data line in the data direction,
  - each of the plurality of pixels is configured to display information according to the corresponding display data signal under a control of the corresponding gate control signal and the corresponding enable signal;
  - the first output terminal is configured to output a first output signal comprising serial enable data signals; and
  - the enable signal acquisition circuit is configured to obtain the serial enable data signals, convert the serial enable data signals to M parallel enable data signals, and output M enable signals to M enable lines according to the M parallel enable data signals, wherein each of the M enable lines corresponds to at least one pixel column, wherein M is a positive integer greater than 1.

2. The electronic device according to claim 1, wherein each of the plurality of pixels further comprises a first switch, a second switch, a capacitor, and a light-emitting element, wherein for each of the plurality of pixels:
- the enable signal is configured to control a state of the corresponding first switch to be on or off;

the gate control signal is configured to control a state of the corresponding second switch to be on or off;

the corresponding capacitor is configured to store the display data signal according to the enable signal applied to the corresponding first switch and the gate control signal applied to the corresponding second switch; and the corresponding light-emitting element is configured to be controlled according to the display data signal stored by the corresponding capacitor.

3. The electronic device according to claim 1, wherein the enable signal acquisition circuit comprises M enable signal acquisition circuits, wherein the M enable signal acquisition circuits are in one-to-one correspondence to the M enable lines; and wherein each of the M enable signal acquisition circuits comprises a first sub-circuit and a second sub-circuit, wherein each first sub-circuit is configured to obtain the serial enable data signals and convert the serial enable data signals to an enable data signal of a corresponding enable line, the second sub-circuit is configured to obtain and store the enable data signal of the corresponding enable line, the second sub-circuit is further configured to transmit the enable signal to at least one pixel through the corresponding enable line according to the stored enable data signal and a first control signal obtained from the data driver circuit.

4. The electronic device according to claim 1, wherein the first output signal further comprises the display data signal;

wherein the data driver circuit further comprises a second output terminal, wherein the second output terminal is configured to output a second control signal; and wherein the enable signal acquisition circuit is further configured to obtain the enable signal from the first output signal according to the second control signal.

5. The electronic device according to claim 4, wherein the enable signal acquisition circuit comprises M enable signal acquisition circuits, wherein the M enable signal acquisition circuits are in one-to-one correspondence to M columns of pixels;

wherein each of the M enable signal acquisition circuits is configured to obtain and store the enable signal of a corresponding pixel column according to the second control signal; and wherein each of the M enable signal acquisition circuits is further configured to output the enable signal of the corresponding pixel column to at least one pixel of the corresponding pixel column with the display data signal of the corresponding pixel column.

6. The electronic device according to claim 5, wherein the data driver circuit comprises a data driver switch, and wherein the data driver switch is configured to control that a signal output by the first output terminal is the display data signal or the enable signal.

7. The electronic device according to claim 6, wherein the enable signal comprises a high voltage signal or a low voltage signal, the data driver switch comprises three switches, and wherein the three switches are configured to control that a signal output by the first output terminal is one of the high voltage signal, the low voltage signal, or the display data signal.

8. The electronic device according to claim 1, wherein the display further comprises a first gate driver on array (GOA) circuit and a second GOA circuit, wherein:

the first GOA circuit is arranged on a first side of the display, the second GOA circuit is arranged on a second side of the display, wherein the first side is an opposite side of the second side;

the data driver circuit is arranged on a third side of the display; and the enable signal acquisition circuit is arranged on a fourth side of the display or on the third side of the display.

9. A pixel comprising:

a first input terminal, configured to receive an enable signal from an enable line in a data direction;

a second input terminal, configured to receive a gate control signal from a gate line in a gate direction;

a third input terminal, configured to receive a display data signal from a data line in the data direction, wherein the first input terminal, the second input terminal, and the third input terminal are different input terminals;

a first switch, wherein the enable signal is configured to control a state of the first switch to be on or off;

a second switch, wherein the gate control signal is configured to control a state of the second switch to be on or off;

a capacitor, configured to store the display data signal according to the enable signal applied to the first switch and the gate control signal applied to the second switch; and a light-emitting element, configured to be controlled according to the display data signal stored by the capacitor; and wherein the pixel is configured to display information according to the display data signal under a control of the gate control signal and the enable signal.

10. The pixel according to claim 9, wherein the enable signal comprises a high voltage signal or a low voltage signal.

11. The pixel according to claim 9, wherein the first switch is configured to electrically connect or isolate the capacitor.

12. A pixel array, comprising a plurality of pixels arranged in gate and data directions forming an array structure, wherein each of the plurality of pixels comprises:

a first input terminal, configured to receive an enable signal from an enable line in the data direction;

a second input terminal, configured to receive a gate control signal from a gate line in the gate direction;

a third input terminal, configured to receive a display data signal from a data line in the data direction, wherein the first input terminal, the second input terminal, and the third input terminal are different input terminals;

a first switch, wherein the enable signal is configured to control a state of the first switch to be on or off;

a second switch, wherein the gate control signal is configured to control a state of the second switch to be on or off;

a capacitor, configured to store the display data signal according to the enable signal applied to the first switch and the gate control signal applied to the second switch; and a light-emitting element, configured to be controlled according to the display data signal stored by the capacitor; and wherein each of the plurality of pixels is configured to display information according to the display data signal under a control of the gate control signal and the enable signal.

13. The pixel array according to claim 12, wherein the enable signal comprises a high voltage signal or a low voltage signal.

14. The pixel array according to claim 12, wherein the first switch of each pixel is configured to electrically connect or isolate the corresponding capacitor.

15. The pixel array according to claim 12, wherein each of the plurality of pixels comprises a power terminal.

16. The pixel according to claim 9, further comprising a first power terminal configured to receive a positive power signal and a second power terminal configured to receive a negative power signal.

17. The pixel according to claim 9, wherein the first switch comprises an enable transistor configured to be turned on or off by the enable signal.

18. The pixel array according to claim 12, wherein the plurality of pixels are arranged in a plurality of rows and a plurality of columns, and wherein the enable line extends along and corresponds to at least one of the plurality of columns of pixels.

19. The pixel array according to claim 12, wherein the pixel array is configured to be divided into a plurality of blocks according to the gate control signal in the gate direction and the enable signal in the data direction, and wherein different ones of the plurality of blocks are configured to be refreshed at different refresh rates.

20. The pixel array according to claim 12, wherein each of the plurality of pixels further comprises a first power terminal configured to receive a positive power signal and a second power terminal configured to receive a negative power signal.

* * * * *